(12) United States Patent
Yamada et al.

(10) Patent No.: US 12,313,448 B2
(45) Date of Patent: May 27, 2025

(54) LASER INTERFEROMETER

(71) Applicant: SEIKO EPSON CORPORATION, Tokyo (JP)

(72) Inventors: Kohei Yamada, Shiojiri (JP); Nobuhito Hayashi, Chino (JP)

(73) Assignee: SEIKO EPSON CORPORATION (JP)

( * ) Notice: Subject to any disclaimer, the term of this patent is extended or adjusted under 35 U.S.C. 154(b) by 387 days.

(21) Appl. No.: 17/898,618

(22) Filed: Aug. 30, 2022

(65) Prior Publication Data

US 2023/0079613 A1  Mar. 16, 2023

(30) Foreign Application Priority Data

Aug. 31, 2021  (JP) ................. 2021-140894

(51) Int. Cl.
| | | |
|---|---|---|
| *G01H 9/00* | (2006.01) | |
| *G01B 9/02* | (2022.01) | |
| *G01B 9/02002* | (2022.01) | |

(52) U.S. Cl.
CPC ............. *G01H 9/00* (2013.01); *G01B 9/02* (2013.01); *G01B 9/02002* (2013.01); *G01B 9/02045* (2013.01); *G01B 9/02083* (2013.01); *G01B 2290/70* (2013.01)

(58) Field of Classification Search
CPC .. G01B 9/02; G01B 9/02002; G01B 9/02045; G01B 9/02083; G01B 9/021; G02F 1/11; G02F 2/00; G01P 3/363; G01P 3/366
See application file for complete search history.

(56) References Cited

U.S. PATENT DOCUMENTS

| | | | |
|---|---|---|---|
| 6,381,015 B1* | 4/2002 | Sonehara ............... | G01N 21/45 356/497 |
| 11,668,555 B2* | 6/2023 | Yamada ................... | G02F 2/00 356/450 |
| 11,733,027 B2* | 8/2023 | Yamada ............. | G01B 9/02002 356/450 |
| 2011/0007323 A1* | 1/2011 | De Groot ............... | G02B 21/14 356/519 |
| 2023/0085489 A1* | 3/2023 | Yamada ............. | G01B 9/02002 356/450 |

FOREIGN PATENT DOCUMENTS

| | | |
|---|---|---|
| JP | H08-035810 A | 2/1996 |
| JP | 2004-170365 A | 6/2004 |
| JP | 2007-285898 A | 11/2007 |
| JP | 2008-309668 A | 12/2008 |

* cited by examiner

*Primary Examiner* — Michael A Lyons
(74) *Attorney, Agent, or Firm* — Harness, Dickey & Pierce, P.L.C.

(57) ABSTRACT

A laser interferometer includes: a laser light source configured to emit laser light; a light shielding element having an opening through which the laser light passes; an optical modulator configured to modulate the laser light into reference light having a different frequency; and a light receiving element configured to receive object light generated by reflecting the laser light by an object to be measured and the reference light and output a light receiving signal. $0.10 \le \varphi_{pin} \le 10.0$, in which $\varphi_{pin}$ [mm] is a diameter of the opening.

12 Claims, 14 Drawing Sheets

LASER INTERFEROMETER

The present application is based on, and claims priority from JP Application Serial Number 2021-140894, filed Aug. 31, 2021, the disclosure of which is hereby incorporated by reference herein in its entirety.

BACKGROUND

1. Technical Field

The present disclosure relates to a laser interferometer.

2. Related Art

JP-A-2007-285898 discloses a laser vibrometer as a device for measuring a vibration speed of an object. In this laser vibrometer, an object to be measured is irradiated with laser light, and the vibration speed is measured based on scattered laser light subjected to a Doppler shift.

Specifically, the laser vibrometer disclosed in JP-A-2007-285898 includes an acousto-optic modulator (AOM). The acousto-optic modulator shifts a frequency of the laser light by changing a frequency of a supplied ultrasonic wave. In the laser vibrometer, the laser light whose frequency is shifted is used as reference light. Then, the scattered laser light derived from the object to be measured and the reference light derived from the acousto-optic modulator are superimposed to extract a beat frequency. The vibration speed of the object to be measured is obtained based on the beat frequency extracted in this way.

In a laser light source, laser oscillation may become unstable due to entry of return light. When the laser oscillation becomes unstable in the laser vibrometer disclosed in JP-A-2007-285898, a quality of the laser light is deteriorated. Accordingly, in the laser vibrometer, a signal-to-noise ratio (S/N ratio) decreases, and a phase of the oscillated laser light becomes discontinuous. As a result, a measurement accuracy of the vibration speed of the object decreases.

SUMMARY

A laser interferometer according to an application example of the present disclosure includes:
  a laser light source configured to emit laser light;
  a light shielding element having an opening through which the laser light passes;
  an optical modulator configured to modulate the laser light into reference light having a different frequency;
  and a light receiving element configured to receive object light generated by reflecting the laser light by an object to be measured and the reference light and output a light receiving signal, in which
  $0.10 \leq \varphi\varphi_{pin} \leq 10.0$, in which $\varphi_{pin}$ [mm] is a diameter of the opening.

DESCRIPTION OF EXEMPLARY EMBODIMENTS

Hereinafter, a laser interferometer according to the present disclosure will be described in detail based on embodiments shown in the accompanying drawings.

1. First Embodiment

First, a laser interferometer according to a first embodiment will be described.

Figure 1:
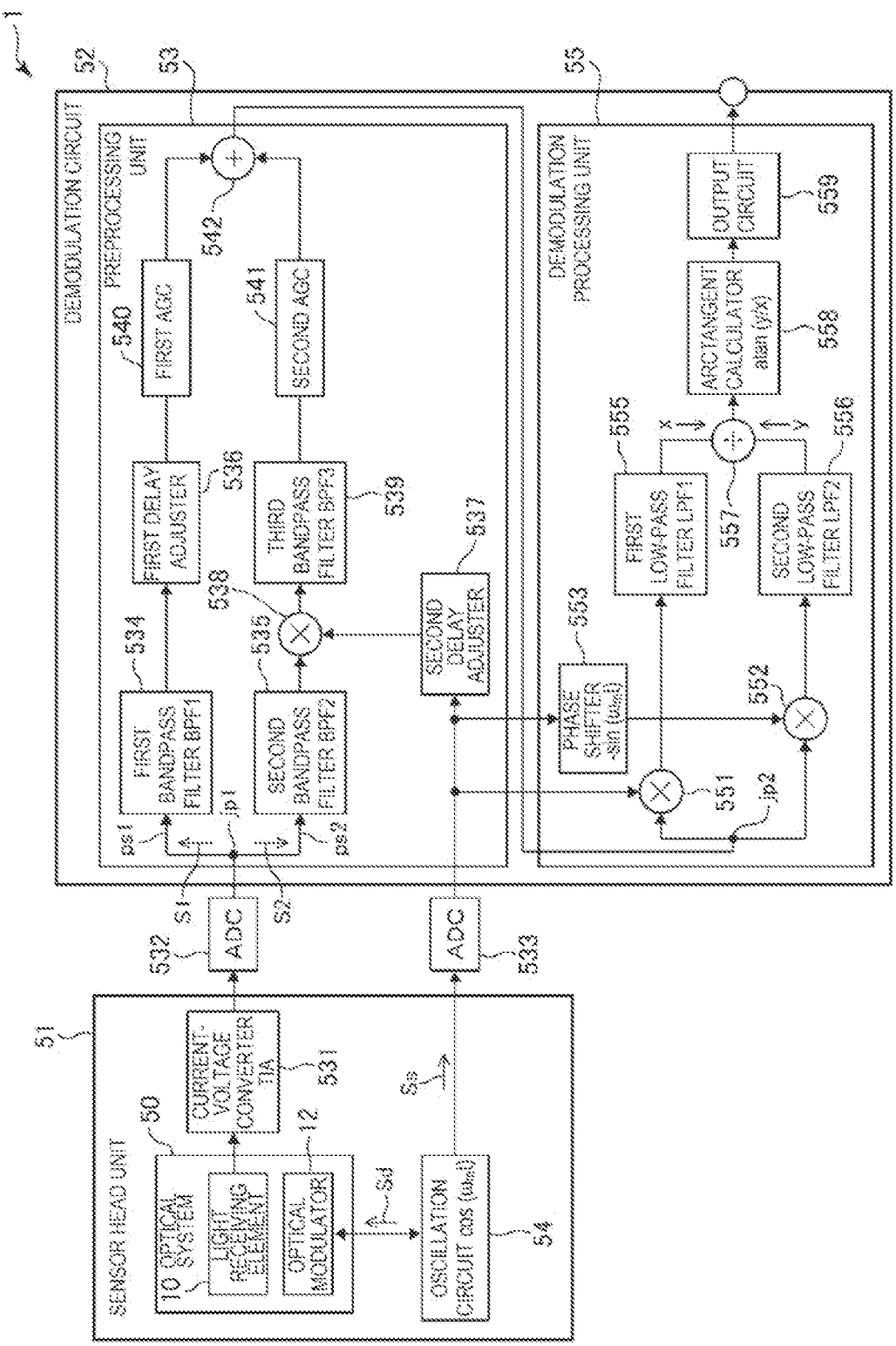
FIG. 1 is a functional block diagram showing a laser interferometer according to a first embodiment.

FIG. 1 is a functional block diagram showing the laser interferometer according to the first embodiment.

A laser interferometer 1 shown in FIG. 1 includes a sensor head unit 51 including an optical system 50 and an oscillation circuit 54, and a demodulation circuit 52 to which a light receiving signal from the optical system 50 is input.

1.1. Sensor Head Unit

Figure 2:
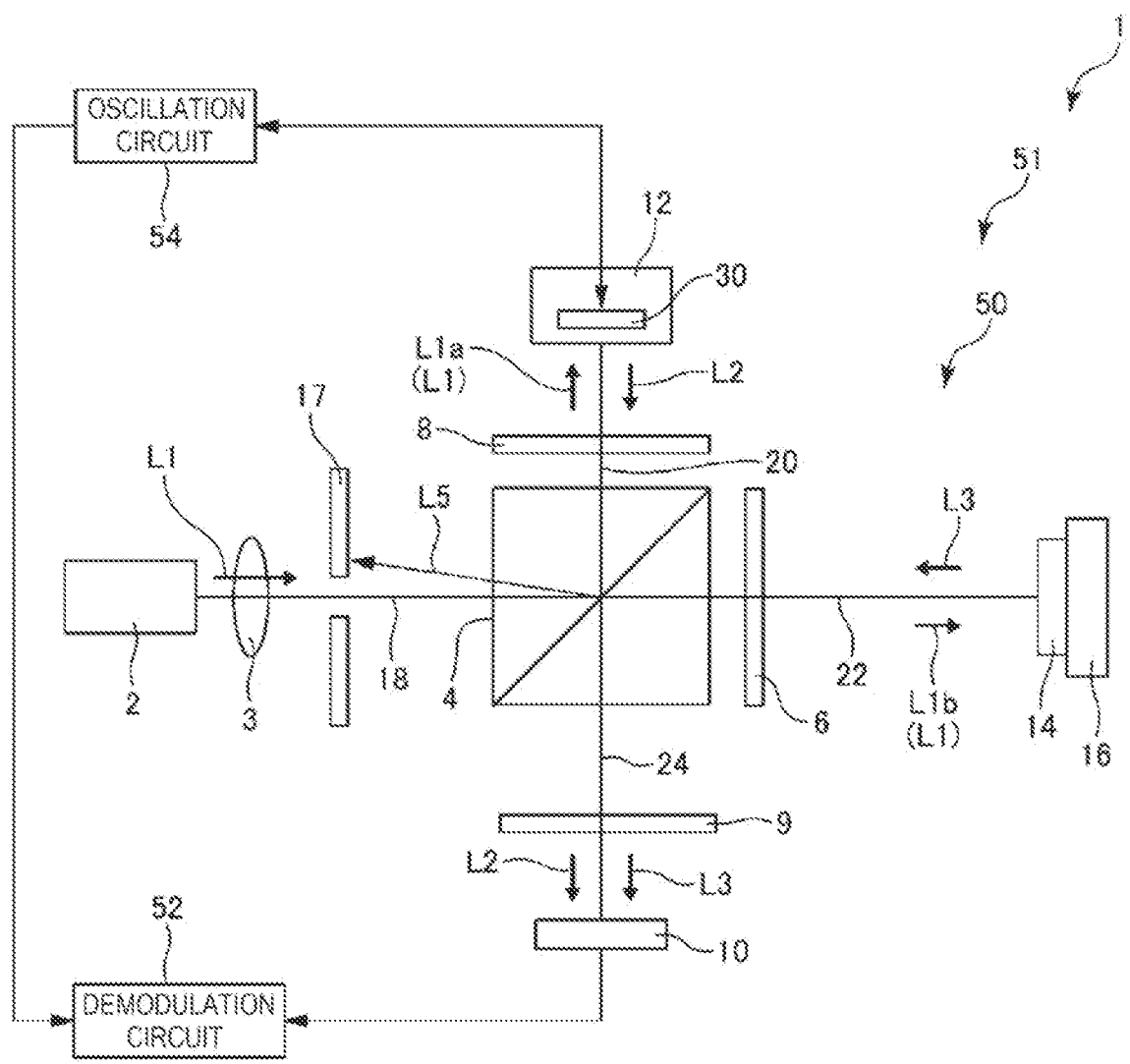
FIG. 2 is a schematic configuration diagram showing a sensor head unit shown in FIG. 1.

FIG. 2 is a schematic configuration diagram showing the sensor head unit 51 shown in FIG. 1.

1.1.1. Optical System

As described above, the sensor head unit 51 includes the optical system 50.

As shown in FIG. 2, the optical system 50 includes a laser light source 2, a collimator lens 3, a polarization beam splitter 4 (light splitter), a quarter-wave plate 6, a quarter-wave plate 8, an analyzer 9, a light receiving element 10, a frequency shifter type optical modulator 12, a setting unit 16 at which an object to be measured 14 is disposed, and a light shielding element 17.

The laser light source 2 emits emission light L1 (laser light) having a predetermined wavelength. The light receiving element 10 converts the received light into an electric signal. The optical modulator 12 includes a vibrator 30, and modulates the emission light L1 to generate reference light L2 including a modulation signal. It is sufficient that the setting unit 16 is provided as necessary, and the object to be measured 14 can be disposed thereon. The emission light L1 incident on the object to be measured 14 is reflected as object light L3 including a sample signal which is a Doppler signal derived from the object to be measured 14.

An optical path of the emission light L1 emitted from the laser light source 2 is referred to as an optical path 18. The optical path 18 is coupled to an optical path 20 by reflection of the polarization beam splitter 4. On the optical path 20, the quarter-wave plate 8 and the optical modulator 12 are disposed in this order from the polarization beam splitter 4 side. Further, the optical path 18 is coupled to an optical path 22 by transmission of the polarization beam splitter 4. On the optical path 22, the quarter-wave plate 6 and the setting unit 16 are disposed in this order from the polarization beam splitter 4 side.

The optical path 20 is coupled to an optical path 24 by the transmission of the polarization beam splitter 4. On the optical path 24, the analyzer 9 and the light receiving element 10 are disposed in this order from the polarization beam splitter 4 side.

The emission light L1 emitted from the laser light source 2 is incident on the optical modulator 12 through the optical path 18 and the optical path 20. The emission light L1 is incident on the object to be measured 14 through the optical path 18 and the optical path 22. The reference light L2 generated by the optical modulator 12 is incident on the light receiving element 10 through the optical path 20 and the optical path 24. The object light L3 generated by the reflection on the object to be measured 14 is incident on the light receiving element 10 through the optical path 22 and the optical path 24.

The term "optical path" in the present specification refers to a path through which light travels, which is set between optical components. Further, an "optical axis" to be described later indicates a central axis of a light beam passing through the optical path.

Hereinafter, each unit of the optical system 50 will be further described.

1.1.1.1. Laser Light Source

The laser light source 2 is a laser light source that emits the coherent emission light L1. As the laser light source 2, a light source having a line width of a MHz band or less may be used. Specific examples thereof include a gas laser such as a He—Ne laser, and a semiconductor laser element such as a distributed feedback-laser diode (DFB-LD), a fiber Bragg grating laser diode (FBG-LD), a vertical cavity surface emitting laser (VCSEL) diode, and a Fabry-Perot laser diode (FP-LD).

The laser light source 2 may be particularly the semiconductor laser element. This makes it possible to particularly reduce a size of the laser light source 2.

Therefore, it is possible to reduce a size of the laser interferometer 1. In particular, in the laser interferometer 1, a size and a weight of the sensor head unit 51 in which the optical system 50 is accommodated are reduced, which is useful in that operability of the laser interferometer 1 is improved.

1.1.1.2. Collimator Lens

The collimator lens 3 is a convex lens disposed between the laser light source 2 and the polarization beam splitter 4. The collimator lens 3 collimates the emission light L1 emitted from the laser light source 2.

When the emission light L1 emitted from the laser light source 2 is sufficiently collimated, for example, when the gas laser such as the He—Ne laser is used as the laser light source 2, the collimator lens 3 may be omitted.

1.1.1.3. Polarization Beam Splitter

The polarization beam splitter 4 is a light splitter disposed between the laser light source 2 and the optical modulator 12 and between the laser light source 2 and the object to be measured 14. The polarization beam splitter 4 splits the emission light L1 into reflection light L1a (first split light) and transmission light L1b (second split light).

The polarization beam splitter 4 has a function of transmitting P-polarized light and reflecting S-polarized light. Hereinafter, a case will be considered in which the emission light L1 is linearly polarized light, in which a ratio of the P-polarized light to the S-polarized light is set to, for example, 50: 50, and is incident on the polarization beam splitter 4.

The reflection light L1a, which is the S-polarized light reflected by the polarization beam splitter 4, is converted into circularly polarized light by the quarter-wave plate 8, and is incident on the optical modulator 12. The circularly polarized light of the reflection light L1a incident on the optical modulator 12 is subjected to a frequency shift of $f_m$ [Hz] and is reflected as the reference light L2. Therefore, the reference light L2 includes the modulation signal of the frequency $f_m$ [Hz]. The reference light L2 is converted into the P-polarized light when passing through the quarter-wave plate 8 again. The P-polarized light of the reference light L2 passes through the polarization beam splitter 4 and the analyzer 9 and is incident on the light receiving element 10.

The transmission light L1b, which is the P-polarized light transmitted through the polarization beam splitter 4, is converted into circularly polarized light by the quarter-wave plate 6, and is incident on the object to be measured 14 in a moving state. The circularly polarized light of the transmission light L1b incident on the object to be measured 14 is subjected to a Doppler shift of $f_d$ [Hz] and is reflected as the object light L3. Therefore, the object light L3 includes the sample signal of the frequency $f_d$ [Hz]. The object light L3 is converted into the S-polarized light when passing through the quarter-wave plate 6 again. The S-polarized light of the object light L3 is reflected by the polarization beam splitter 4, passes through the analyzer 9, and is incident on the light receiving element 10.

As described above, since the emission light L1 is coherent, the reference light L2 and the object light L3 are incident on the light receiving element 10 as interference light.

A non-polarization beam splitter may be used instead of the polarization beam splitter. In this case, since the quarter-wave plate 6, the quarter-wave plate 8, and the like are unnecessary, the size of the laser interferometer 1 can be reduced by reducing the number of components. Further, a light splitter other than the polarization beam splitter 4 may be used.

1.1.1.4. Analyzer

Since the S-polarized light and the P-polarized light orthogonal to each other are independent of each other, a beat due to interference does not appear only by simply superimposing the S-polarized light and the P-polarized light. Therefore, a light wave obtained by superimposing the S-polarized light and the P-polarized light is passed through the analyzer 9 inclined by 45° with respect to both the S-polarized light and the P-polarized light. By using the analyzer 9, it is possible to transmit light of components common to each other and cause the interference. As a result, in the analyzer 9, the reference light L2 and the object light L3 interfere with each other, and the interference light having a frequency of $|f_m - f_d|$ [Hz] is generated.

1.1.1.5. Light Receiving Element

The reference light L2 and the object light L3 are incident on the light receiving element 10 via the polarization beam splitter 4 and the analyzer 9. The reference light L2 and the object light L3 interfere with each other by optical heterodyne and are incident on the light receiving element 10 as the interference light having the frequency of $|f_m - f_d|$ [Hz]. By demodulating the sample signal from the interference light by a method to be described later, a movement, that is, a vibration speed and a displacement of the object to be measured 14 can be obtained finally. Examples of the light receiving element 10 include a photodiode.

1.1.1.6. Optical Modulator

Figure 3:
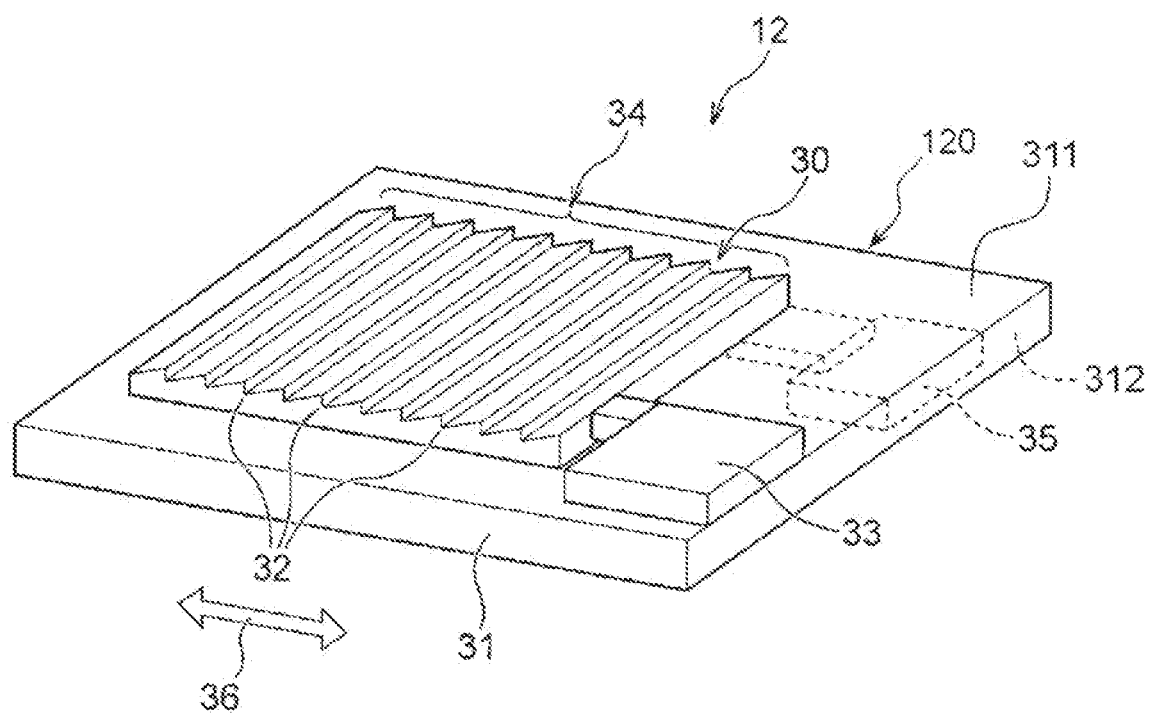
FIG. 3 is a perspective view showing a first configuration example of an optical modulator shown in FIG. 2.

FIG. 3 is a perspective view showing a first configuration example of the optical modulator 12 shown in FIG. 2.

1.1.1.6.1. Overview of First Configuration Example of Optical Modulator

The frequency shifter type optical modulator 12 includes an optical modulation resonator 120. The optical modulation resonator 120 shown in FIG. 3 includes the plate-shaped vibrator 30 and a substrate 31 that supports the vibrator 30.

The vibrator 30 is formed of a material that repeats a mode in which the vibrator 30 vibrates so as to be strained in a direction along a surface by applying a potential. In the present configuration example, the vibrator 30 is a quartz crystal AT resonator that performs thickness-shear vibration along a vibration direction 36 in a high frequency region of the MHz band. A diffraction grating 34 is formed on a surface of the vibrator 30. The diffraction grating 34 has a structure in which grooves 32 intersecting the vibration direction 36, that is, a plurality of linear grooves 32 extending in a direction intersecting the vibration direction 36 are periodically arranged.

The substrate 31 has a front surface 311 and a back surface 312 having a front and back relationship with each other. The vibrator 30 is disposed on the front surface 311. A pad 33 for applying a potential to the vibrator 30 is provided on the front surface 311. Meanwhile, a pad 35 for applying a potential to the vibrator 30 is provided on the back surface 312.

A size of the substrate 31 is, for example, about 0.5 mm or more and 10.0 mm or less on a long side. A thickness of the substrate 31 is, for example, about 0.10 mm or more and 2.0 mm or less. For example, a shape of the substrate 31 is a square having a side of 1.6 mm and a thickness of 0.35 mm.

A size of the vibrator 30 is, for example, about 0.2 mm or more and 3.0 mm or less on a long side. A thickness of the vibrator 30 is, for example, about 0.003 mm or more and 0.5 mm or less.

For example, a shape of the vibrator 30 is a square having a side of 1.0 mm and a thickness of 0.07 mm. In this case, the vibrator 30 oscillates at a basic oscillation frequency of 24 MHz. The oscillation frequency can be adjusted in a range of 1 MHz to 1 GHz by changing the thickness of the vibrator 30 or considering an overtone.

Although the diffraction grating 34 is formed on the entire surface of the vibrator 30 in FIG. 3, the diffraction grating 34 may be formed only on a part of the surface of the vibrator 30.

A magnitude of optical modulation by the optical modulator 12 is given by an inner product of a difference wavenumber vector between a wavenumber vector of the emission light L1 that is incident on the optical modulator 12 and a wavenumber vector of the reference light L2 emitted from the optical modulator 12 and a vector of the vibrator 30 in the vibration direction 36. In the present configuration example, the vibrator 30 performs the thickness-shear vibration, but since this vibration is in-plane vibration, even if light is incident perpendicularly to the surface of the vibrator 30 itself, the optical modulation cannot be performed. Therefore, in the present configuration example, by providing the diffraction grating 34 on the vibrator 30, the optical modulation can be performed by a principle to be described later.

The diffraction grating 34 shown in FIG. 3 is a blazed diffraction grating. The blazed diffraction grating refers to a diffraction grating having a stepwise cross-sectional shape. The linear grooves 32 of the diffraction grating 34 are provided such that an extending direction thereof is orthogonal to the vibration direction 36.

When a driving signal Sd is supplied (AC voltage is applied) from the oscillation circuit 54 shown in FIGS. 1 and 2 to the vibrator 30 shown in FIG. 3, the vibrator 30 oscillates. Power (driving power) required for the oscillation of the vibrator 30 is not particularly limited, and is as small as about 0.1 µW to 100 mW. Therefore, the driving signal Sd output from the oscillation circuit 54 can be used to cause the vibrator 30 to oscillate without being amplified.

Since an optical modulator in the related art may require a structure for maintaining a temperature of the optical modulator, it is difficult to reduce a volume thereof. Further, the optical modulator in the related art has a problem in that it is difficult to reduce a size and power consumption of a laser interferometer because of large power consumption thereof. In contrast, in the present configuration example, since a volume of the vibrator 30 is extremely small and the power required for the oscillation is also small, the size and power consumption of the laser interferometer 1 can be easily reduced.

1.1.1.6.2. Method for Forming Diffraction Grating

A method for forming the diffraction grating 34 is not particularly limited, and examples thereof include a method in which a mold is formed by a mechanical wire type (routing engine) method, and the grooves 32 are formed on an electrode formed on the surface of the vibrator 30 of the quartz crystal AT resonator by a nanoimprinting method. Here, a reason why the grooves 32 are formed on the electrode is that, in the case of the quartz crystal AT resonator, a high-quality thickness-shear vibration can be generated on the electrode in principle. The grooves 32 are not limited to being formed on the electrode, and may be formed on a surface of a material of a non-electrode portion. Further, instead of the nanoimprinting method, a processing method by exposure and etching, an electron beam lithography method, a focused ion beam (FIB) processing method, or the like may be used.

In addition, the diffraction grating may be formed by a resist material on a chip of the quartz crystal AT resonator, and a metal film or a mirror film formed of a dielectric multilayer film may be provided thereon. By providing the metal film or the mirror film, reflectance of the diffraction grating 34 can be increased.

Further, a resist film may be formed on the chip or a wafer of the quartz crystal AT resonator, processed by etching, then removed, and then the metal film or the mirror film may be formed on a surface to be processed. In this case, since the resist material is removed, an influence of moisture absorption or the like of the resist material is eliminated, and chemical stability of the diffraction grating 34 can be improved. Further, by providing the metal film having high conductivity such as Au or Al, the metal film can also be used as an electrode for driving the vibrator 30.

The diffraction grating 34 may be formed using a technique such as anodized alumina (porous alumina).

1.1.1.6.3. Other Configuration Examples of Optical Modulator

The vibrator 30 is not limited to the quartz crystal resonator, and may be, for example, a Si resonator, a surface acoustic wave (SAW) device, and a ceramic resonator.

Figure 4:
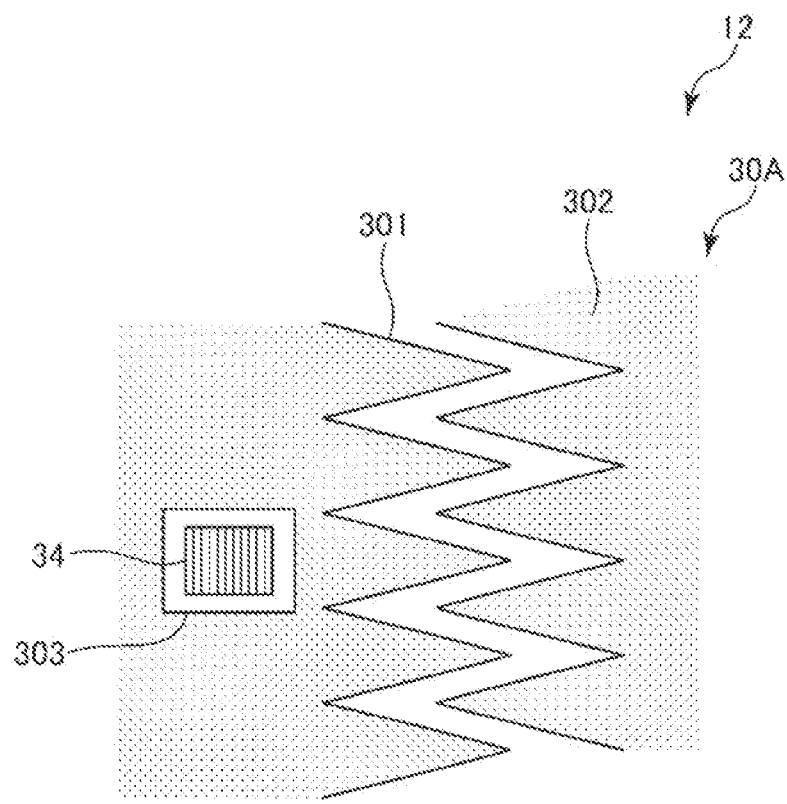
FIG. 4 is a plan view showing a part of a second configuration example of the optical modulator.
Figure 5:
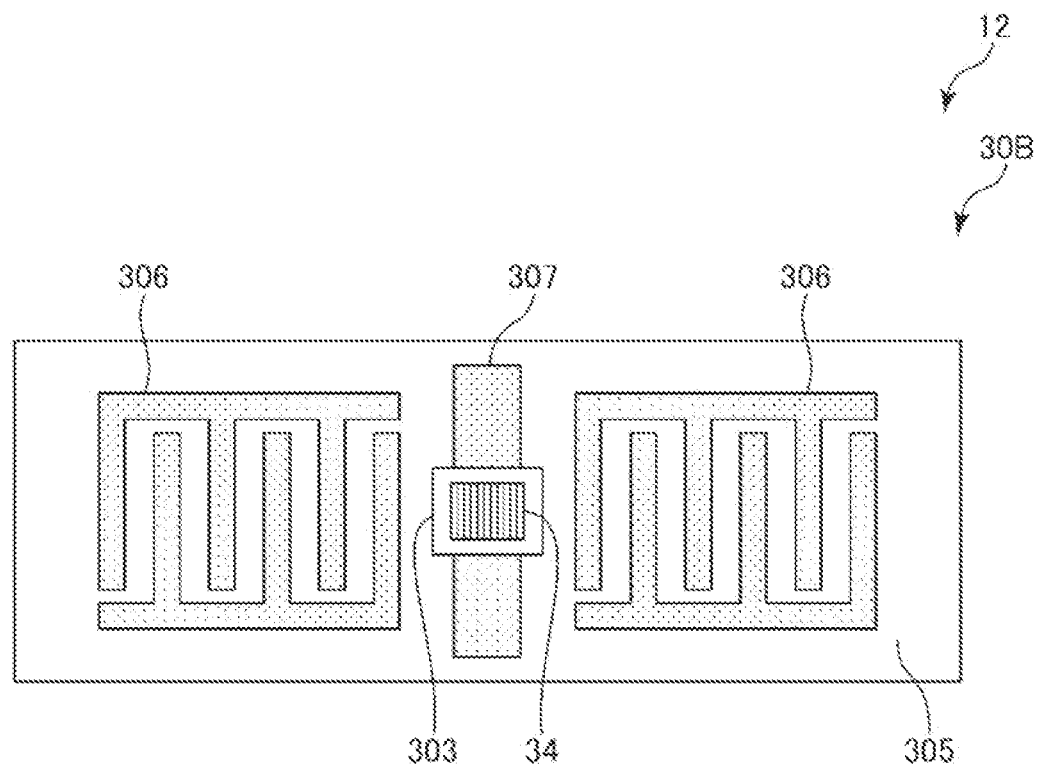
FIG. 5 is a plan view showing a third configuration example of the optical modulator.

FIG. 4 is a plan view showing a part of a second configuration example of the optical modulator 12. FIG. 5 is a plan view showing a third configuration example of the optical modulator 12.

A vibrator 30A shown in FIG. 4 is a Si resonator manufactured from a Si substrate using an MEMS technique. The MEMS refers to a micro electro mechanical system.

The vibrator 30A includes a first electrode 301 and a second electrode 302 adjacent to each other on the same plane with a gap therebetween, a diffraction grating mounting portion 303 provided on the first electrode 301, and the diffraction grating 34 provided on the diffraction grating mounting portion 303. For example, the first electrode 301 and the second electrode 302 vibrate, using electrostatic attraction as a driving force, so as to repeatedly approach and separate from each other in a left-right direction of FIG. 4, that is, along an axis coupling the first electrode 301 and the second electrode 302 shown in FIG. 4. Accordingly, the in-plane vibration can be applied to the diffraction grating 34. An oscillation frequency of the Si resonator is, for example, about 1 kHz to several hundreds of MHz.

A vibrator 30B shown in FIG. 5 is an SAW device using a surface wave. The SAW refers to a surface acoustic wave. The vibrator 30B includes a piezoelectric substrate 305, comb-shaped electrodes 306 provided on the piezoelectric substrate 305, a ground electrode 307, the diffraction grating mounting portion 303, and the diffraction grating 34. When an AC voltage is applied to the comb-shaped electrodes 306, the surface acoustic wave is excited by an inverse piezoelectric effect. Accordingly, the in-plane vibration can be applied to the diffraction grating 34. An oscillation frequency of the SAW device is, for example, about several hundreds of MHz to several GHz.

Also in the device as described above, by providing the diffraction grating 34, similarly to the case of the quartz crystal AT resonator, it is possible to perform optical modulation by the principle described later.

Meanwhile, when the vibrator 30 is the quartz crystal resonator, the highly accurate modulation signal can be generated using an extremely high Q value of quartz crystal. The Q value is an index indicating sharpness of a resonance peak. In addition, the quartz crystal resonator is characterized by being less likely to be affected by disturbance. Therefore, by using the modulation signal modulated by the optical modulator 12 including the quartz crystal resonator, the sample signal derived from the object to be measured 14 can be acquired with high accuracy.

1.1.1.6.4. Optical Modulation by Vibrator

Next, the principle of modulating light using the vibrator 30 will be described.

Figure 6:
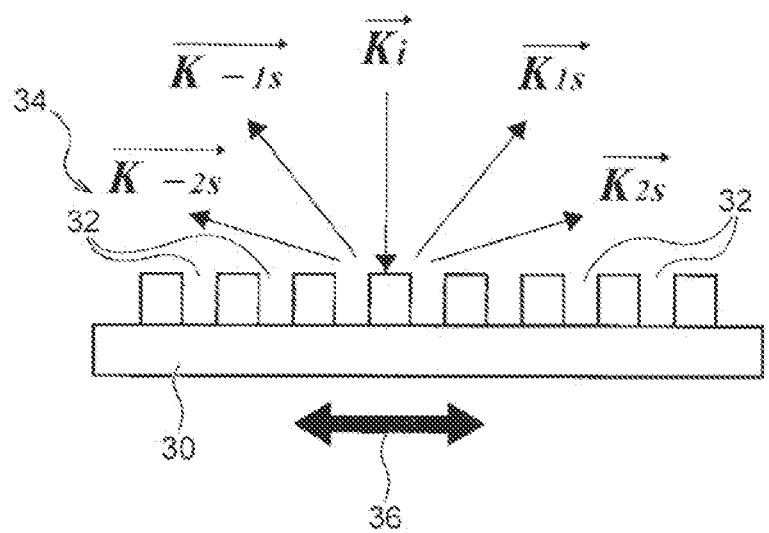
FIG. 6 is a conceptual diagram showing that a plurality of diffracted light beams are generated when incident light $K_i$ is incident from a direction perpendicular to a surface of a vibrator.

FIG. 6 is a conceptual diagram showing that a plurality of diffracted light beams are generated when incident light $K_i$ is incident from a direction perpendicular to the surface of the vibrator 30.

As shown in FIG. 6, when the incident light $K_i$ is incident on the diffraction grating 34 that performs the thickness-shear vibration along the vibration direction 36, a plurality of diffracted light beams $K_{ns}$ are generated due to a diffraction phenomenon. n is an order of the diffracted light beams $K_{ns}$, and n=0, ±1, ±2, and so on. The diffraction grating 34 shown in FIG. 6 does not show the blazed diffraction grating shown in FIG. 3, and shows a diffraction grating formed by repeating projections and recesses as an example of another diffraction grating. FIG. 6 omits the diffracted light beam $K_{0s}$.

In FIG. 6, the incident light $K_i$ is incident from the direction perpendicular to the surface of the vibrator 30, and an incident angle thereof is not particularly limited. The incident angle may be set such that the incident light $K_i$ is obliquely incident on the surface of the vibrator 30. When the incident light $K_i$ is obliquely incident thereon, traveling directions of the diffracted light beams $K_{ns}$ also change accordingly.

Depending on a design of the diffraction grating 34, high-order light of |n|≥2 may not appear. Therefore, it is desirable to set |n|=1 in order to stably obtain the modulation signal. That is, in the laser interferometer 1 of FIG. 2, the frequency shifter type optical modulator 12 may be disposed such that the ±1st order diffracted light beams are used as the reference light L2. With this arrangement, measurement by the laser interferometer 1 can be stabilized.

On the other hand, when the high-order light of |n| 2 appears from the diffraction grating 34, the optical modulator 12 may be disposed such that any diffracted light beam of ±2nd order or more is used as the reference light L2 instead of the ±1st order diffracted light beam. Accordingly, the laser interferometer 1 can be made higher in frequency and smaller in size because the high-order diffracted light beams can be used.

In the present embodiment, for example, the optical modulator 12 is configured such that an angle formed by an entering direction of the incident light $K_i$ that is incident on the optical modulator 12 and a traveling direction of the reference light L2 emitted from the optical modulator 12 is 180°. Hereinafter, three examples will be described.

Figure 7:
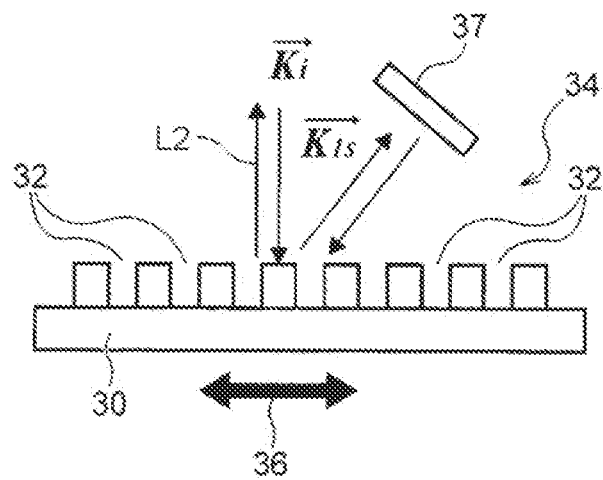
FIG. 7 is a conceptual diagram showing the optical modulator configured such that an angle formed by a traveling direction of the incident light $K_i$ and a traveling direction of a reference light L2 is 180°.
Figure 8:
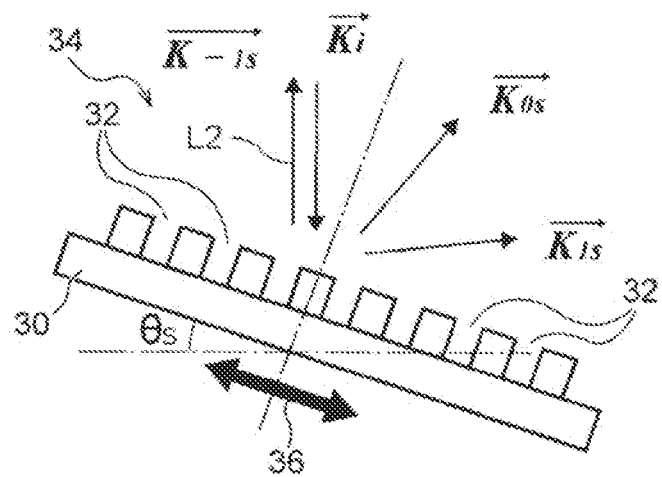
FIG. 8 is a conceptual diagram showing the optical modulator configured such that the angle formed by the traveling direction of the incident light $K_i$ and the traveling direction of the reference light L2 is 180°.
Figure 9:
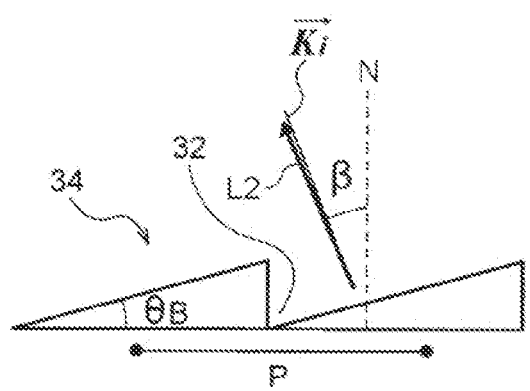
FIG. 9 is a conceptual diagram showing the optical modulator configured such that the angle formed by the traveling direction of the incident light $K_i$ and the traveling direction of the reference light L2 is 180°.

FIGS. 7 to 9 are conceptual diagrams showing the optical modulator 12 configured such that the angle formed by the traveling direction of the incident light $K_i$ and the traveling direction of the reference light L2 is 180°.

The optical modulator 12 shown in FIG. 7 includes a mirror 37 in addition to the vibrator 30. The mirror 37 is disposed so as to reflect the diffracted light beam $K_{1s}$ and return the diffracted light beam $K_{1s}$ to the diffraction grating 34. At this time, an angle formed by an incident angle of the diffracted light beam $K_{1s}$ with respect to the mirror 37 and a reflection angle of the mirror 37 is 180°. As a result, the diffracted light beam $K_{1s}$ emitted from the mirror 37 and returned to the diffraction grating 34 is diffracted again by the diffraction grating 34 and travels in a direction opposite to the traveling direction of the incident light $K_i$ that is incident on the optical modulator 12. Therefore, by adding the mirror 37, it is possible to satisfy the above-described condition that the angle formed by the entering direction of the incident light $K_i$ and the traveling direction of the reference light L2 is 180°.

By being reflected by the mirror 37 in this manner, the reference light L2 generated by the optical modulator 12 is subjected to frequency modulation twice. Therefore, by using the mirror 37 in combination, it is possible to perform the frequency modulation at a higher frequency than in a case of using the vibrator 30 alone.

In FIG. 8, the vibrator 30 is inclined with respect to that in an arrangement in FIG. 6. An inclination angle θs at this time is set so as to satisfy the above-described condition that the angle formed by the entering direction of the incident light $K_i$ and the traveling direction of the reference light L2 is 180°.

The diffraction grating 34 shown in FIG. 9 is the blazed diffraction grating having a blaze angle $θ_B$. Then, when the incident light $K_i$ traveling at an incident angle β with respect to a normal line N of the surface of the vibrator 30 is incident on the diffraction grating 34, the reference light L2 returns at the same angle as the blaze angle $θ_B$ with respect to the normal line N. Therefore, by setting the incident angle β equal to the blaze angle $θ_B$, it is possible to satisfy the above-described condition that the angle formed by the entering direction of the incident light $K_i$ and the traveling direction of the reference light L2 is 180°. In this case, since the above-described condition can be satisfied without using the mirror 37 shown in FIG. 7 and without tilting the vibrator 30 itself as shown in FIG. 8, it is possible to further reduce the size of the laser interferometer 1 and increase the frequency thereof. In particular, in the case of the blazed diffraction grating, an arrangement satisfying the above condition is referred to as a "Littrow arrangement", and there is also an advantage that a diffraction efficiency of a diffracted light beam can be particularly increased.

A pitch P in FIG. 9 represents a pitch of the blazed diffraction grating, and for example, the pitch P is 1 μm. The blaze angle $θ_B$ is, for example, 25°. In this case, in order to satisfy the above-described condition, the incident angle β with respect to the normal line N of the incident light $K_i$ may be set to 25°.

1.1.1.6.5. Package Structure

Figure 10:
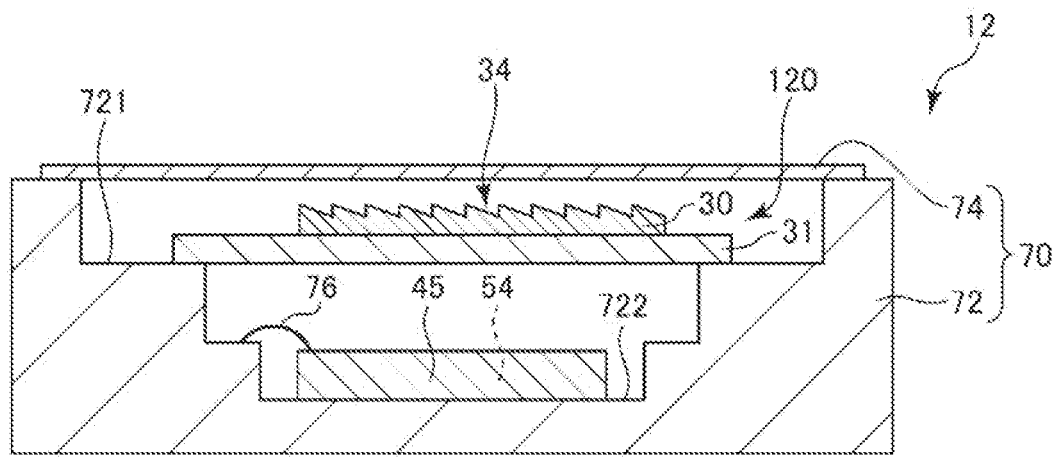
FIG. 10 is a cross-sectional view showing the optical modulator having a package structure.

FIG. 10 is a cross-sectional view showing the optical modulator 12 having a package structure.

The optical modulator 12 shown in FIG. 10 includes a container 70 serving as a housing, the optical modulation resonator 120 accommodated in the container 70, and a circuit element 45 constituting the oscillation circuit 54. The container 70 is hermetically sealed in, for example, a reduced-pressure atmosphere such as vacuum or an inert gas atmosphere such as nitrogen or argon.

As shown in FIG. 10, the container 70 includes a container body 72 and a lid 74. The container body 72 includes a first recessed portion 721 provided inside the container body 72 and a second recessed portion 722 provided inside the first recessed portion 721 and deeper than the first recessed portion 721. The container body 72 is formed of a ceramic material, a resin material, or the like. Although not shown, the container body 72 includes an internal terminal provided at an inner surface, an external terminal provided at an outer surface, a wiring connecting the internal terminal and the external terminal, and the like.

An opening portion of the container body 72 is closed by the lid 74 via a sealing member such as a seal ring or low-melting glass (not shown). Constituent materials of the lid 74 include a material capable of transmitting laser light, for example, a glass material.

The optical modulation resonator 120 is disposed at a bottom surface of the first recessed portion 721. The optical modulation resonator 120 is supported at the bottom surface of the first recessed portion 721 by a bonding member (not shown). The internal terminal of the container body 72 and the optical modulation resonator 120 are electrically coupled to each other via a conductive material (not shown) such as a bonding wire or a bonding metal.

The circuit element 45 is disposed at a bottom surface of the second recessed portion 722. The circuit element 45 is electrically coupled to the internal terminal of the container body 72 via a bonding wire 76. Accordingly, the optical modulation resonator 120 and the circuit element 45 are also electrically coupled to each other via the wiring included in the container body 72. The circuit element 45 may be provided with a circuit other than the oscillation circuit 54 to be described later.

By adopting such a package structure, since the optical modulation resonator 120 and the circuit element 45 can be overlapped with each other, a physical distance between the optical modulation vibrator 120 and the circuit element 45 can be reduced, and a wiring length between the optical modulation vibrator 120 and the circuit element 45 can be shortened. Therefore, it is possible to prevent a noise from entering the driving signal Sd from the outside or to prevent the driving signal Sd from becoming a noise source. In addition, both the optical modulation resonator 120 and the circuit element 45 can be protected from the external environment by one container 70. Therefore, it is possible to improve the reliability of the laser interferometer 1 while reducing the size of the sensor head unit 51.

A structure of the container 70 is not limited to the shown structure, and, for example, the optical modulation resonator 120 and the circuit element 45 may have separate package structures. Although not shown, other circuit elements constituting the oscillation circuit 54 may be accommodated in the container 70. The container 70 may be provided as necessary, and may be omitted.

The optical modulator 12 is not limited to the one including the vibrator 30 as described above, and may be, for example, an acousto-optic modulator (AOM) or an electro-optic modulator (EOM). When the AOM or the EOM is applied to the optical modulator 12, a light reflection function may be added to the AOM or the EOM.

1.1.1.7. Light Shielding Element

The light shielding element 17 is an iris (diaphragm) disposed between the collimator lens 3 and the polarization beam splitter 4. The light shielding element 17 has an opening 172 provided corresponding to the optical path 18. The light shielding element 17 prevents return light L5 generated by the optical modulator 12, the object to be measured 14, or the like from being incident on the laser light source 2. Since the light shielding element 17 only needs to have a function of shielding the return light L5, a structure thereof is extremely simple. This contributes to simplification of the structure of the laser interferometer 1. The light shielding element 17 may be a slit, a pinhole, or the like, and the structure thereof is not particularly limited.

Functions and effects of the light shielding element 17 will be described in detail later.

1.1.2. Oscillation Circuit

As shown in FIG. 1, the oscillation circuit 54 outputs the driving signal Sd to be received by the optical modulator 12 of the optical system 50. In addition, the oscillation circuit 54 outputs a reference signal Ss to be received by the demodulation circuit 52.

Figure 11:
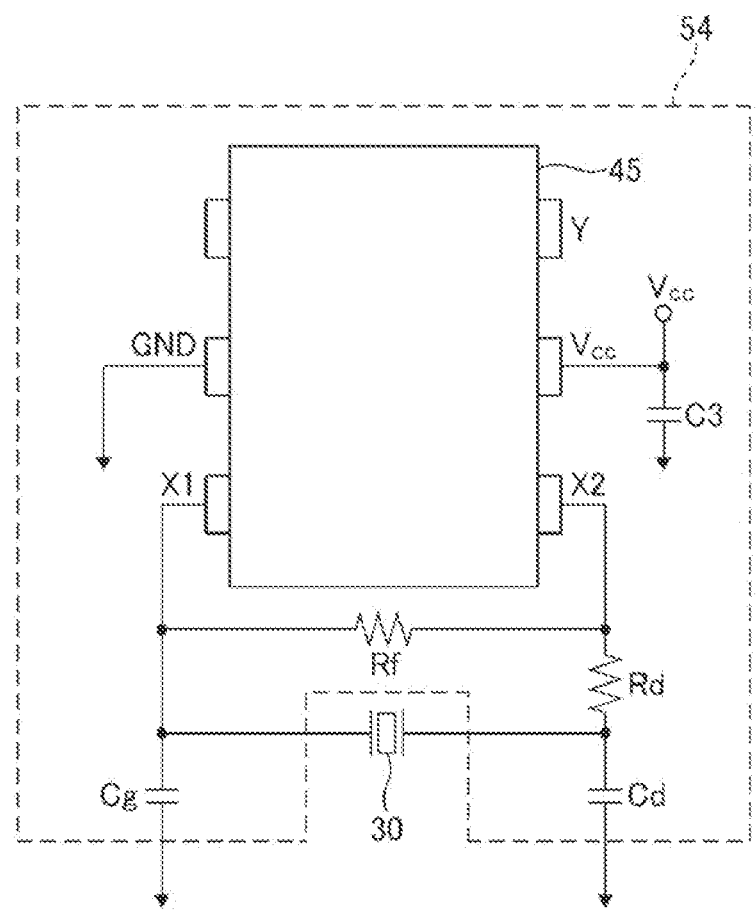
FIG. 11 is a circuit diagram showing a configuration of a single-stage inverter oscillation circuit.

The oscillation circuit 54 is not particularly limited as long as the oscillation circuit 54 is a circuit capable of oscillating the vibrator 30, and circuits having various configurations are used. FIG. 11 is a circuit diagram showing a configuration of a single-stage inverter oscillation circuit as an example of a circuit configuration.

The oscillation circuit 54 shown in FIG. 11 includes the circuit element 45, a feedback resistor Rf, a limiting resistor Rd, a first capacitor Cg, a second capacitor Cd, and a third capacitor C3.

The circuit element 45 is an inverter IC. A terminal X1 and a terminal X2 of the circuit element 45 are terminals coupled to an inverter inside the circuit element 45. A terminal GND is coupled to a ground potential, and a terminal Vcc is coupled to a power supply potential. A terminal Y is a terminal for oscillation output.

The first capacitor Cg is coupled between the terminal X1 and the ground potential. The limiting resistor Rd and the second capacitor Cd coupled in series to each other are coupled between the terminal X2 and the ground potential in this order from the terminal X2 side. One end of the feedback resistor Rf is coupled between the terminal X1 and the first capacitor Cg, and the other end of the feedback resistor Rf is coupled between the terminal X2 and the limiting resistor Rd.

One end of the vibrator 30 is coupled between the first capacitor Cg and the feedback resistor Rf, and the other end of the vibrator 30 is coupled between the second capacitor Cd and the limiting resistor Rd. Accordingly, the vibrator 30 serves as a signal source of the oscillation circuit 54.

Figure 12:
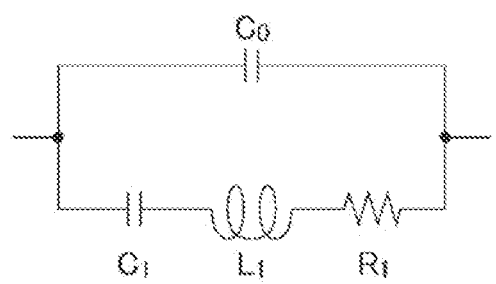
FIG. 12 is an example of an LCR equivalent circuit of the vibrator.

FIG. 12 is an example of an LCR equivalent circuit of the vibrator 30.

As shown in FIG. 12, the LCR equivalent circuit of the vibrator 30 includes a series capacitance $C_1$, a series inductance $L_1$, an equivalent series resistance $R_1$, and a parallel capacitance $C_0$.

In the oscillation circuit 54 shown in FIG. 11, a load capacitance $C_L$ is given by the following equation (a) in which $C_g$ is a capacitance of the first capacitor $C_g$ and $C_d$ is a capacitance of the second capacitor $C_d$.

$$C_L = \frac{C_d C_g}{C_d + C_g} \tag{a}$$

Then, an oscillation frequency $f_{osc}$ output from the terminal Y of the oscillation circuit 54 is given by the following equation (b).

$$f_{osc} = f_Q \sqrt{1 + \frac{C_1}{C_0 + C_L}} \tag{b}$$

$f_Q$ is a natural frequency of the vibrator 30.

According to the above-described equation (b), it can be seen that the oscillation frequency $f_{osc}$ of a signal output from the terminal Y can be finely adjusted by appropriately changing the load capacitance $C_L$.

A difference $\Delta f$ between the natural frequency $f_Q$ of the vibrator 30 and the oscillation frequency $f_{osc}$ of the oscillation circuit 54 is given by the following equation (c).

$$\Delta f = f_{osc} - f_Q = f_Q \left( \sqrt{1 + \frac{C_1}{C_0 + C_L}} - 1 \right) \tag{c}$$

Here, since $C_1 \ll C_0$, and $C_1 \ll C_L$, $\Delta f$ is approximately given by the following equation (d).

$$\Delta f = f_{osc} - f_Q \cong \frac{C_1}{2(C_0 + C_L)} f_Q \tag{d}$$

Therefore, the oscillation frequency $f_{osc}$ of the oscillation circuit 54 has a value corresponding to the natural frequency $f_Q$ of the vibrator 30.

Here, when the vibrator 30 is fixed to, for example, the container 70, the natural frequency $f_Q$ fluctuates when the vibrator 30 receives expansion stress due to temperature via a fixing portion. In addition, when the vibrator 30 is tilted, the natural frequency $f_Q$ fluctuates under an influence of gravity or the like due to its own weight.

In the oscillation circuit 54, when the natural frequency $f_Q$ fluctuates for such a reason, the oscillation frequency $f_{osc}$ changes in conjunction with the fluctuation based on the above-described equation (d). That is, the oscillation frequency $f_{osc}$ always has a value shifted by $\Delta f$ from the natural frequency $f_Q$. Accordingly, the vibration of the vibrator 30 is stabilized, and a displacement amplitude is stabilized. Since a modulation characteristic of the optical modulator 12 is stabilized by stabilizing the displacement amplitude, a demodulation accuracy of the sample signal in the demodulation circuit 52 can be improved.

For example, $\Delta f = |f_{osc} - f_Q| \leq 3000$ [Hz] is preferable, and 600 [Hz] is more preferable.

As described above, in the laser interferometer 1 according to the present embodiment, the optical modulator 12 includes the vibrator 30. The optical modulator 12 modulates the reflection light L1a (laser light) using the vibrator 30.

According to such a configuration, a size and a weight of the optical modulator 12 can be reduced. Accordingly, the size and the weight of the laser interferometer 1 can be reduced.

The laser interferometer 1 according to the present embodiment includes the demodulation circuit 52 and the oscillation circuit 54. The oscillation circuit 54 includes the vibrator 30 as the signal source, and as shown in FIG. 1, outputs the reference signal Ss to the demodulation circuit 52. The demodulation circuit 52 demodulates the sample signal derived from the object to be measured 14 from the light receiving signal based on the reference signal Ss.

According to such a configuration, even when the natural frequency $f_Q$ of the vibrator 30 fluctuates, the oscillation frequency $f_{osc}$ of the oscillation circuit 54 can be changed to a value corresponding to the natural frequency $f_Q$ of the vibrator 30, and thus the vibration of the vibrator 30 can be easily stabilized. Accordingly, a temperature characteristic of the modulation signal can be made to correspond to a temperature characteristic of the vibrator 30, and the modulation characteristic of the optical modulator 12 can be stabilized. As a result, the demodulation accuracy of the sample signal in the demodulation circuit 52 can be improved.

In the above-described configuration, a temperature characteristic of the reference signal Ss output from the oscillation circuit 54 to the demodulation circuit 52 can also be made to correspond to the temperature characteristic of the vibrator 30. Then, since both the temperature characteristic of the modulation signal and the temperature characteristic of the reference signal correspond to the temperature characteristic of the vibrator 30, a behavior of the fluctuation of the modulation signal and a behavior of the fluctuation of the reference signal Ss due to a temperature change coincide with or approximate to each other. Therefore, even when a temperature of the vibrator 30 changes, an influence on the demodulation accuracy can be prevented, and the demodulation accuracy of the sample signal derived from the object to be measured 14 can be improved.

Further, in the present embodiment, since power consumption of the oscillation circuit 54 is low, power consumption of the laser interferometer 1 can be easily reduced.

Instead of the oscillation circuit 54, for example, a signal generator such as a function generator or a signal generator may be used.

1.2. Demodulation Circuit

The demodulation circuit 52 performs demodulation processing of demodulating the sample signal derived from the object to be measured 14 from the light receiving signal output from the light receiving element 10. The sample signal includes, for example, phase information and frequency information. The displacement of the object to be measured 14 can be acquired from the phase information, and the speed of the object to be measured 14 can be acquired from the frequency information. When different types of information can be acquired in this manner, the laser interferometer 1 functions as a displacement meter or a speedometer, and thus the laser interferometer 1 can be highly functioned.

A circuit configuration of the demodulation circuit 52 is set in accordance with a method of modulation processing. In the laser interferometer 1 according to the present embodiment, the optical modulator 12 including the vibrator 30 is used. Since the vibrator 30 is an element that performs simple oscillation, a vibration speed changes every moment in a cycle. Therefore, a modulation frequency also changes with time, and a demodulation circuit in the related art cannot be used as it is.

The demodulation circuit in the related art refers to, for example, a circuit that demodulates a sample signal from a light receiving signal including a modulation signal modulated using an acousto-optic modulator (AOM). In the acousto-optic modulator, the modulation frequency does not change. Therefore, the demodulation circuit in the related art can demodulate the sample signal from the light receiving signal including the modulation signal in which the modulation frequency does not change, but cannot demodulate the sample signal as it is in a case in which the light receiving signal includes the modulation signal modulated by the optical modulator 12 in which the modulation frequency changes.

Therefore, the demodulation circuit 52 shown in FIG. 1 includes a preprocessing unit 53 and a demodulation processing unit 55. The light receiving signal output from the light receiving element 10 is first passed through the preprocessing unit 53 and then guided to the demodulation processing unit 55. The preprocessing unit 53 performs preprocessing on the light receiving signal. By this preprocessing, a signal that can be demodulated by the demodulation circuit in the related art is obtained. Therefore, the demodulation processing unit 55 demodulates the sample signal derived from the object to be measured 14 by the known demodulation method.

1.2.1. Configuration of Preprocessing Unit

The preprocessing unit 53 shown in FIG. 1 includes a first bandpass filter 534, a second bandpass filter 535, a first delay adjuster 536, a second delay adjuster 537, a multiplier 538, a third bandpass filter 539, a first AGC 540, a second AGC 541, and an adder 542. The AGC refers to auto gain control.

A current-voltage converter 531 and an ADC 532 are coupled between the light receiving element 10 and the preprocessing unit 53 in this order from the light receiving element 10 side. The current-voltage converter 531 is a transimpedance amplifier, and converts a current output from the light receiving element 10 into a voltage signal. The ADC 532 is an analog-to-digital converter, and converts an analog signal into a digital signal with a predetermined number of sampling bits.

The current output from the light receiving element 10 is converted into the voltage signal by the current-voltage converter 531. The voltage signal is converted into the digital signal by the ADC 532, and the digital signal is split into a first signal S1 and a second signal S2 at a branch portion jp1. In FIG. 1, a path of the first signal S1 is referred to as a first signal path ps1, and a path of the second signal S2 is referred to as a second signal path ps2.

An ADC 533 is coupled between the oscillation circuit 54 and the second delay adjuster 537. The ADC 533 is an analog-to-digital converter, and converts an analog signal into a digital signal with a predetermined number of sampling bits.

Each of the first bandpass filter 534, the second bandpass filter 535, and the third bandpass filter 539 is a filter that selectively transmits a signal in a specific frequency band.

Each of the first delay adjuster 536 and the second delay adjuster 537 is a circuit that adjusts a delay of a signal. The multiplier 538 is a circuit that generates an output signal proportional to a product of two input signals. The adder 542 is a circuit that generates an output signal proportional to a sum of the two input signals.

Next, an operation of the preprocessing unit 53 will be described along flows of the first signal S1, the second signal S2, and the reference signal Ss.

A group delay of the first signal S1 is adjusted by the first delay adjuster 536 after the first signal S1 passes through the first bandpass filter 534 disposed on the first signal path ps1. The group delay adjusted by the first delay adjuster 536 corresponds to a group delay of the second signal S2 by the second bandpass filter 535 to be described later. By this delay adjustment, a delay time associated with passage of a filter circuit can be made uniform between the first bandpass filter 534 through which the first signal S1 passes and the second bandpass filter 535 and the third bandpass filter 539 through which the second signal S2 passes. The first signal S1 passing through the first delay adjuster 536 is input to the adder 542 via the first AGC 540.

The second signal S2 is input to the multiplier 538 after passing through the second bandpass filter 535 disposed on the second signal path ps2. The multiplier 538 multiplies the second signal S2 by the reference signal Ss output from the second delay adjuster 537. Specifically, the reference signal Ss that is represented by $\cos(\omega_m t)$ and output from the oscillation circuit 54 is subjected to digital conversion by the ADC 533 and phase adjustment by the second delay adjuster 537, and is input to the multiplier 538. $\omega_m$ is an angular frequency of the signal modulated by the optical modulator 12, and t is a time. Thereafter, the second signal S2 passes through the third bandpass filter 539, and then is input to the adder 542 via the second AGC 541.

The output signal proportional to the sum of the first signal S1 and the second signal S2 is output from the adder 542 to the demodulation processing unit 55.

1.2.2. Basic Principle of Preprocessing

Next, a basic principle of the preprocessing in the preprocessing unit 53 will be described. Here, the basic principle refers to a principle described in JP-A-2-38889. In the following description, for example, a system in which the frequency as the modulation signal changes in a sine wave shape and the displacement of the object to be measured 14 also changes in an optical axis direction with the simple oscillation will be considered. Here, $E_m$, $E_d$, and $\varphi$ are expressed as follows.

$$E_m = a_m\{\cos(\omega_0 t + B \sin \omega_m t + \phi_m) + i \sin(\omega_0 t + B \sin \omega_m t + \phi_m)\} \quad (1)$$

$$E_d = a_d\{(\cos(\omega_0 t + A \sin \omega_d t + \phi_d) + i \sin(\phi_0 t + A \sin \omega_d t + \phi_d)\} \quad (2)$$

$$\phi = \phi_m - \phi_d \quad (3)$$

In this case, a light receiving signal $I_{PD}$ output from the light receiving element 10 is theoretically expressed by the following equation.

$$\begin{aligned}
I_{PD} &= \langle |E_m + E_d|^2 \rangle \\
&= \langle |E_m^2 + E_d^2 + 2E_m E_d| \rangle \\
&= a_m^2 + a_d^2 + 2a_m a_d \cos(B\sin\omega_m t - A\sin\omega_d t - \phi)
\end{aligned} \quad (4)$$

$E_m$, $E_d$, $\varphi_m$, $\varphi_d$, $\varphi$, $\omega_m$, $\omega_d$, $\omega_0$, $a_m$, and $a_d$ are as follows.

$E_m$: electric-field component of modulation signal derived from optical modulator $E_d$: electric-field component of sample signal derived from object to be measured $\varphi_m$: Initial phase of modulation signal derived from optical modulator $\varphi_d$: Initial phase of sample signal derived from object to be measured $\varphi$: Optical path phase difference of laser interferometer $\omega_m$: angular frequency of modulation signal derived from optical modulator $\omega_d$: angular frequency of sample signal derived from object to be measured $\omega_0$: angular frequency of emission light emitted from light source $a_m$: coefficient $a_d$: coefficient In addition, $\langle \; \rangle$ in the equation (4) represents a time average.

A first term and a second term of the abive-described equation (4) represent a C component, and a third term represents an aC componsent. $I_{PD-AC}$ is expressed by the following equation in which $I_{PD-AC}$ is the AC component.

$$\begin{aligned}
I_{PD-AC} &= 2a_m a_d \cos(B\sin\omega_m t - A\sin\omega_d t + \phi) \\
&= 2a_m a_d \{\cos(B\sin\omega_m t)\cos(A\sin\omega_d t - \phi) + \\
&\quad \sin(B\sin\omega_m t)\sin(A\sin\omega_d t - \phi)\}
\end{aligned} \quad (5)$$

$$A = \frac{f_{dmax}}{f_d} \quad (6)$$

$$B = \frac{f_{mmax}}{f_m} \quad (7)$$

A: phase shift of sample signal $f_{dmax}$: Doppler frequency shift of sample signal $f_d$: frequency of sample signal B: phase shift of modulation signal $f_{mmax}$: Doppler frequency shift of modulation signal $f_m$ frequency of modulation signal Here, v-order Bessel functions such as the following equations (8) and (9) are known.

$$\cos\{\zeta \sin(2\pi f_v t)\} = J_0(\zeta)\cos(2 \cdot 2\pi f_v t) + 2J_4 \cos(4 \cdot 2f_v t) + \ldots \quad (8)$$

$$\sin\{\zeta \sin(2\pi f_v t)\} = 2J_1(\zeta)\sin(1 \cdot 2\pi f_v t) + 2J_3(\zeta)\sin(3 \cdot 2\pi f_v t) + \ldots \quad (9)$$

When the above-described equation (5) is subjected to series expansion using the Bessel functions of the above-described equations (8) and (9), the equation (5) can be transformed into the following equation (10).

$$\begin{aligned}
I_{PD-AC} &= 2a_m a_d [\{f_0(B) + 2J_2(B)\cos(2\cdot\omega_m t) + 2J_4(B)\cos(4\cdot\omega_m t) + \ldots\}\cos(A \sin \omega_d t - \varphi) - \{2J_1(B)\sin(1\cdot\omega_m t) + 2J_3(B)\sin(3\omega_m t) + \ldots\}\sin(A \sin \omega_d t - 0)]
\end{aligned} \quad (10)$$

$J_0(B)$, $J_1(B)$, $J_2(B)$, ... are Bessel coefficients.

When transformed as described above, theoretically, it can be said that a band corresponding to a specific order can be extracted by the bandpass filter.

Therefore, in the preprocessing unit 53 described above, the preprocessing is performed on the light receiving signal in the following flow based on this theory.

First, the light receiving signal output from the ADC 532 described above is split into two signals of the first signal S1 and the second signal S2 at the branch portion jp1. The first signal S1 passes through the first bandpass filter 534. A central angular frequency of the first bandpass filter 534 is set to $\omega_m$. Accordingly, the first signal S1 after passing through the first bandpass filter 534 is expressed by the following equation.

$$\begin{aligned}
I_{pass1} &= J_1(B)\{-\cos(\omega_m t + A\sin\omega_d t - \phi) + \cos(\omega_m t - A\sin\omega_d t + \phi)\} \\
&= -2J_1(B)\sin(\omega_m t)\sin(A\sin\omega_d t - \phi)
\end{aligned} \quad (11)$$

Meanwhile, the second signal S2 passes through the second bandpass filter 535. A central angular frequency of the second bandpass filter 535 is set to a value different from the central angular frequency of the first bandpass filter 534. Here, for example, the central angular frequency of the second bandpass filter 535 is set to $2\omega_m$. Accordingly, the second signal S2 after passing through the second bandpass filter 535 is expressed by the following equation.

$$\begin{aligned}
I_{BPF2} &= J_2(B)\cos(2\cdot\omega_m t) \cdot \cos(A\sin\omega_d t - \phi) \\
&= \frac{1}{2}J_2(B)\{\cos(2\cdot\omega_m t + \cos(A\sin\omega_d t - \phi)) + \cos(2\cdot\omega_m t - \cos(A\sin\omega_d t - \phi))\}
\end{aligned} \quad (12)$$

The second signal S2 after passing through the second bandpass filter 535 is multiplied by the reference signal Ss by the multiplier 538. The second signal S2 after passing through the multiplier 538 is expressed by the following equation.

$$I_{cos(\omega_m t)} = \frac{1}{2}J_2(B)\{\cos(2\cdot\omega_m t + A\sin\omega_d t - \phi) + \cos(2\cdot\omega_m t - A\sin\omega_d t + \phi)\}\cdot\cos(\omega_m t)$$
$$= \frac{1}{2}J_2(B)\{\cos(3\cdot\omega_m t + A\sin\omega_d t - \phi) + \cos(1\cdot\omega_m t + A\sin\omega_d t - \phi) + \cos(3\cdot\omega_m t - A\sin\omega_d t + \phi) + \cos(1\cdot\omega_m t - A\sin\omega_d t + \phi)\} \quad (13)$$

The second signal S2 after passing through the multiplier 538 is passed through the third bandpass filter 539. A central angular frequency of the third bandpass filter 539 is set to the same value as the central angular frequency of the first bandpass filter 534. Here, for example, the central angular frequency of the third bandpass filter 539 is set to $\omega_m$. Thus, the second signal S2 after passing through the third bandpass filter 539 is expressed by the following equation.

$$I_{pass2} = \frac{1}{2}J_2(B)\{\cos(\omega_m t + A\sin\omega_d t - \phi) + \cos(\omega_m t - A\sin\omega_d t + \phi)\} \quad (14)$$
$$J_2(B)\cos(\omega_m t)\cos(A\sin\omega_d t - \phi)$$

Thereafter, a phase of the first signal S1 expressed by the above-described equation (11) is adjusted by the first delay adjuster 536, and an amplitude of the first signal S1 is adjusted by the first AGC 540.

An amplitude of the second signal S2 expressed by the above-described equation (14) is also adjusted by the second AGC 541, and the amplitude of the second signal S2 is made equal to the amplitude of the first signal S1.

Then, the first signal S1 and the second signal S2 are summed by the adder 542. An addition result is expressed by the following equation (15).

$$I_{s3} = \cos(\omega_m t + A\sin\omega_d t - \phi) \quad (15)$$

As shown in the above-described equation (15), as a result of the addition, unnecessary terms disappear, and necessary terms can be extracted. The result is input to the demodulation processing unit 55.

1.2.3. Configuration of Demodulation Processing Unit

The demodulation processing unit 55 performs the demodulation processing of demodulating the sample signal derived from the object to be measured 14 from a signal output from the preprocessing unit 53. The demodulation processing is not particularly limited, and a known quadrature detection method may be used. The quadrature detection method is a method of performing the demodulation processing by performing an operation of mixing external signals orthogonal to each other with an input signal.

The demodulation processing unit 55 shown in FIG. 1 is a digital circuit including a multiplier 551, a multiplier 552, a phase shifter 553, a first low-pass filter 555, a second low-pass filter 556, a divider 557, an arctangent calculator 558, and an output circuit 559.

1.2.4. Demodulation Processing by Demodulation Processing Unit

In the demodulation processing, first, the signal output from the preprocessing unit 53 is split into two signals at a branch portion jp2. One of the divided signals is multiplied, in the multiplier 551, by the reference signal Ss that is output from the oscillation circuit 54 and is represented by cos ($\omega_m$t). The other divided signal is multiplied, in the multiplier 552, by a signal that is obtained by shifting the phase of the reference signal Ss output from the oscillation circuit 54 by −90° by the phase shifter 553 and is represented by −sin ($\omega_m$t). The reference signal Ss and the signal obtained by shifting the phase of the reference signal Ss are signals whose phases are shifted from each other by 90°.

The signal passing through the multiplier 551 passes through the first low-pass filter 555, and is then input to the divider 557 as a signal x. The signal passing through the multiplier 552 passes through the second low-pass filter 556, and is then input to the divider 557 as a signal y. The divider 557 divides the signal y by the signal x, and an output y/x is passed through the arctangent calculator 558 to obtain an output atan (y/x).

Thereafter, the output atan (y/x) is passed through the output circuit 559 to obtain a phase $\varphi_d$ as information derived from the object to be measured 14. The output circuit 559 performs phase connection when there is a phase jump of 2π at adjacent points by phase unwrapping processing. The displacement of the object to be measured 14 can be calculated from the phase information output from the demodulation processing unit 55. Accordingly, the function serving as a displacement meter is implemented. Further, the speed can be obtained based on the displacement. Accordingly, the function serving as a speedometer is implemented.

A circuit configuration of the demodulation processing unit 55 has been described above, and the circuit configuration of the digital circuit is an example and is not limited thereto. For example, the configuration of the preprocessing unit 53 is not limited to the above-described configuration. The demodulation processing unit 55 is not limited to a digital circuit, and may be an analog circuit. The analog circuit may include an F/V converter circuit or a ΔΣ counter circuit.

In the circuit configuration of the demodulation processing unit 55 described above, the frequency information derived from the object to be measured 14 may be obtained. The speed of the object to be measured 14 can be calculated based on the frequency information.

1.3. Prevention of Return Light by Light Shielding Element

Next, prevention of the return light by the light shielding element 17 will be described.

The emission light L1 emitted from the laser light source 2 is diffused by a light diffraction phenomenon. Specifically, a light diameter R of the emission light L1 emitted from the laser light source 2 having a light diameter $R_{LD}$ is expressed by the following equation (16) using a diffusion radiation angle θ at a position separated by a distance $x_{LD}$.

$$R = R_{LD} + \theta x_{LD} \quad (16)$$

In the above-described equation (16), a second term is a term of diffraction. The diffraction phenomenon is generally represented by the following equation (16-1).

$$R_{LD} \sin\theta = m\lambda \tag{16-1}$$

Second and subsequent higher-order diffraction terms are sufficiently small, and thus are not taken into consideration. In this case, m can be set to 1. In addition, since the diffusion radiation angle θ is generally small, 0<<1. Therefore, the above-described equation (16-1) can be transformed into the following equation (16-2).

$$\theta = \frac{\lambda}{R_{LD}} \tag{16-2}$$

Then, the equation (16) can be transformed into the following equation (16-3).

$$R = R_{LD} + \frac{x_{LD}}{R_{LD}}\lambda \tag{16-3}$$

From the above-described equation (16-3), the light diameter R when the emission light L1 emitted from the laser light source 2 is incident on the collimator lens 3 is obtained.

Figure 13:
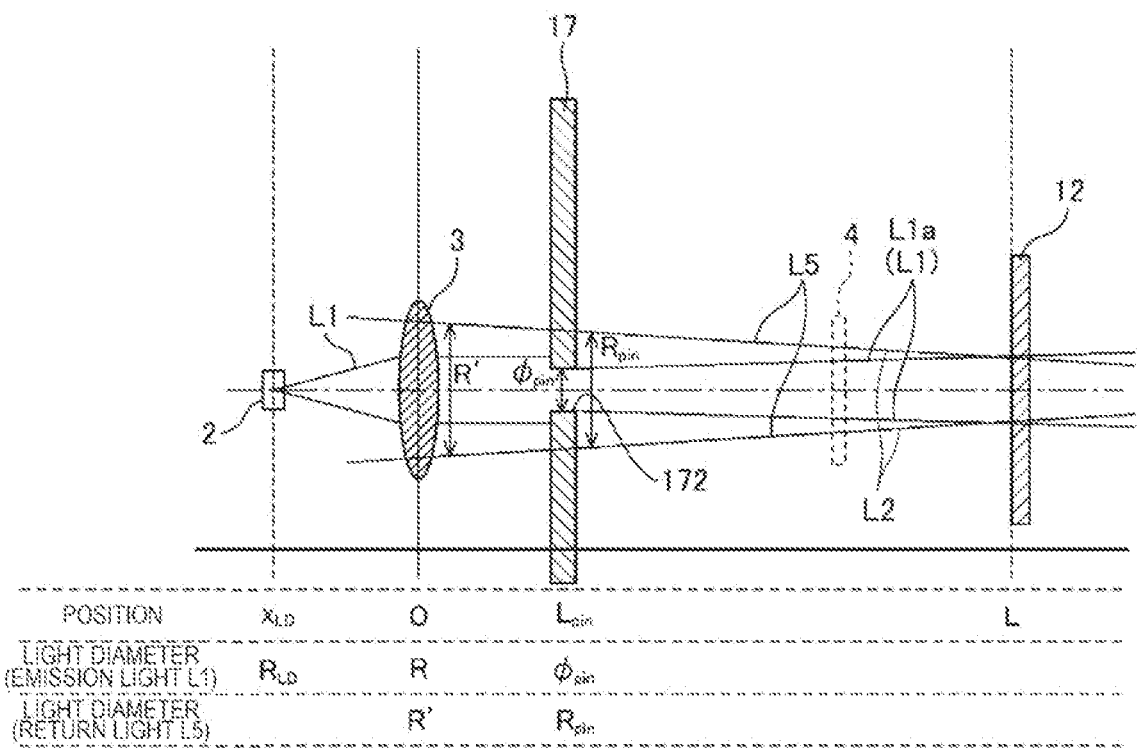
FIG. 13 is a schematic diagram showing a light trace of emission light L1 emitted from a laser light source shown in FIG. 2 and a light trace when the reference light L2 generated by reflecting the emission light L1 by the optical modulator is directed to the laser light source as return light L5.

FIG. 13 is a schematic diagram showing a light trace of the emission light L1 emitted from the laser light source 2 shown in FIG. 2 and a light trace when the reference light L2 generated by reflecting the emission light L1 by the optical modulator 12 travels to the laser light source 2 as the return light L5. In FIG. 13, for convenience of illustration, an optical path refracted in the middle is shown in an extended manner. The return light L5 may include light derived from the object light L3 (not shown) in addition to light derived from the reference light L2 shown in FIG. 13. Further, the return light L5 may be constituted by only the light derived from the object light L3.

In FIG. 13, a center of the collimator lens 3 is defined as an origin 0 (reference position), and a distance between the origin 0 and the optical modulator 12 is defined as L. When the collimator lens 3 is omitted, a position at which the collimated light is generated is set as the origin 0 (reference position). For example, in a gas laser such as a He—Ne laser, since the collimated light is emitted from an emission point, the emission point is the origin. A light diameter when the return light L5 reaches the collimator lens 3 is defined as R'.

Then, the light diameter R' of the return light L5 is expressed by the following equation (16-4).

$$R' = R + \frac{2L}{R}\lambda \tag{16-4}$$

In the optical system 50 shown in FIG. 13, a light intensity of the return light L5 reaching the laser light source 2 is reduced by providing the light shielding element 17. A principle thereof will be described below.

The light shielding element 17 is provided between the collimator lens 3 and the polarization beam splitter 4. Therefore, when a diameter $\varphi_{pin}$ of the opening 172 of the light shielding element 17 is made smaller than the light diameter R' of the return light L5, the light intensity of the return light L5 can be reduced.

The return light L5 becomes a reason of destabilizing the laser oscillation in the laser light source 2. Therefore, when the light intensity of the return light L5 can be reduced, the laser oscillation can be stabilized. When the opening 172 is not a perfect circle, the diameter $\varphi_{pin}$ of the opening 172 is a diameter of a perfect circle inscribed in the opening 172.

The destabilization of the laser oscillation caused by the return light L5 is associated with self-mixing coupling in the laser light source 2. The self-mixing coupling is quantified by an index M that is a product of a "coupling coefficient" and a "light amount of the return light L5". The coupling coefficient is proportional to a reciprocal of a resonator length of the laser light source 2. Therefore, the self-mixing coupling is likely to become obvious when the light amount of the return light L5 increases in a semiconductor laser element having a short resonator length. When the self-mixing coupling is prevented in the semiconductor laser element, it is considered that the self-mixing coupling is prevented in most types of light sources.

Here, inventors have found that the index M needs to satisfy $M < 10^{-6}$ in order to prevent the self-mixing coupling in the laser light source 2, which corresponds to satisfying OD6 when a light intensity shielding capability of the light shielding element 17 is expressed by an optical density (OD value). Therefore, when the light shielding element 17 has the shielding capability satisfying OD6, the laser oscillation can be stabilized.

In view of this, it is sufficient that a light intensity $P_0$ of the emission light L1 and a light intensity $P_r$ of the return light L5 that is not shielded by the light shielding element 17 may satisfy a relationship of the following equation (17).

$$\frac{P_r}{P_0} < 1 \times 10^{-6} \tag{17}$$

Here, a light intensity of the return light L5 immediately before being incident on the light shielding element 17 is P'r. The light intensity P'r of the return light L5 is expressed by the following equation (18). The following equation (18) is an example of a case in which a light intensity distribution of the emission light L1 is a Gaussian distribution or a distribution similar thereto.

$$P'_r = P_1 \times P_2 \times P_3 \tag{18}$$

$$P_1 = P \int_0^{\frac{\phi_{pin}}{2}} \exp\left(-\frac{2r^2}{w^2}\right) r\,dr \tag{18-1}$$

$$w = \frac{r}{2} = \frac{\lambda}{2\theta} \tag{18-1-1}$$

$$P_1 = \frac{w^2}{4} P \left\{ 1 - \exp\left(-\frac{\phi_{pin}^2}{2w^2}\right) \right\} \tag{18-1-2}$$

$$P_2 = \frac{1}{2}(\mathit{Refl}_M + \mathit{Refl}_S) \tag{18-2}$$

$$P_3 = 1 - \cos^2(2\Delta\psi) \tag{18-3}$$

In the above-described equation (18-1), P is a peak light intensity of the emission light L1, r is a position in a radial direction from a central axis of the emission light L1, and w is a distance from the central axis of the emission light L1 in the radial direction at a position where the light intensity of the emission light L1 is $1/e^2$ of the peak light intensity. In the case of the emission light L1, since θ<<1, θ=λ/r.

Therefore, w is expressed by the above-described equation (18-1-1). Then, the above-described equation (18-1) can be transformed into the above-described equation (18-1-2). In the above-described equation (18-2), $Refl_M$ is a light reflectance of the optical modulator 12, and $Refl_s$ is a light reflectance of the object to be measured 14. In the above-described equation (18-3), $\Delta\Psi$ is an error in an installation angle of a half-wave plate formed in a pseudo manner by the two quarter-wave plates 6 and 8.

$P_1$ represented by the above-described equation (18-1) represents the light intensity of the emission light L1 passing through the opening 172 of the light shielding element 17. $P_2$ represented by the above-described equation (18-2) represents the reflectance of the optical modulator 12 and the reflectance of the object to be measured 14. $P_3$ represented by the above-described equation (18-3) represents an intensity of light returning to the laser light source 2 side through the polarization beam splitter 4 when unintended polarized light is generated due to an allowable angle error of the half-wave plate.

Based on the above-described equation (18), when the emission light L1 and the return light L5 have a coaxial relationship with each other, the light intensity Pr of the return light L5 that is not shielded by the light shielding element 17 and passes through the opening 172 is expressed by the following equation (19).

$$P_r = P'_r \iint_{\text{Within circle having diameter } \varphi_{pin}} \exp\left\{-2\frac{x^2+y^2}{w^2}\right\} dx dy \tag{19}$$

In the above-described equation (19), x and y are positions along two axes orthogonal to each other in a cross section of the return light L5. Further, when the light intensity distribution of the emission light L1 is the Gaussian distribution when a standard deviation of the light intensity distribution is $\sigma$, $w=2\sigma$.

Therefore, the diameter $\varphi_{pin}$ of the opening 172 of the light shielding element 17 may be selected such that the light intensity Pr calculated by the above-described equation (19) satisfies the equation (17). Accordingly, the laser interferometer 1 in which the laser oscillation is stabilized can be implemented.

Specifically, in the present embodiment, the diameter $\varphi_{pin}$ [mm] of the opening 172 may satisfy a relationship of the following equation (20).

$$0.10 \leq \varphi_{pin} \leq 10.0 \tag{20}$$

When the diameter $\varphi_{pin}$ of the opening 172 is within this range, the return light L5 can be shielded by the light shielding element 17. Accordingly, the light intensity of the return light L5 reaching the laser light source 2 can be reduced, and the laser oscillation can be prevented from becoming unstable.

1.3.1. Calculation Example 1

Calculation Example 1 will be described as an example when the light intensity Pr calculated by the above-described equation (19) satisfies the equation (17). Parameters and a calculation result of Calculation Example 1 are as shown in Table 1.

TABLE 1

| | Calculation Example 1 | Value | Unit |
|---|---|---|---|
| Parameters | Diameter ($\varphi_{pin}$ of Opening 172 of Light shielding element 17 | 0.1 | mm |
| | Diffusion Radiation Angle $\theta$ of Emission Light L1 | 20 | deg |
| | Wavelength $\lambda$ of Emission Light L1 | 850 | nm |
| | Light Diameter $R_{LD}$ of Laser Light Source 2 | 2.435 | pm |
| | Distance $X_{LD}$ Between Collimator Lens 3 and Laser Light Source 2 | 4.0 | mm |
| | Light Diameter R of Emission Light L1 Passing Through Collimator Lens 3 | 1.40 | mm |
| | Distance L Between Collimator Lens 3 and Optical Modulator 12 | 80.0 | mm |
| | Light Reflectance $Refl_M$ of Optical Modulator 12 | 30 | % |
| | Light Reflectance $Refl_S$ of Object To Be Measured 14 | 80 | % |
| | Distance $L_{pin}$ between Collimator Lens 3 and Light shielding element 17 | 8.0 | mm |
| | Light Diameter $R_{pin}$ of Return Light L5 of Light shielding element 17 | 1.39 | mm |
| | Error $\Delta_\Psi$ of Installation Angle of Half-Wave Plate Formed by Two Quarter-Wave Plates 6 and 8 | 1.0 | deg |
| Calculation Result | Ratio $P_r/P_0$ of Light Intensity $P_r$ of Return Light L5 not Shielded By Light shielding element 17 To Light Intensity $P_0$ of Emission Light L1 | $3.53 \times 10^{-7}$ | — |

In Calculation Example 1, as shown in Table 1, when the diameter $\varphi_{pin}$ of the opening 172 of the light shielding element 17 is set to 0.1 mm, the distance $x_{LD}$ between the collimator lens 3 and the laser light source 2 is set to 4.0 mm, and the error $\Delta\Psi$ of the installation angle of the half-wave plate is reduced to 1.0 deg, a calculation result of $P_r/P_0$ is less than $1\times10^{-6}$. Therefore, in Calculation Example 1, the incidence of the return light L5 on the laser light source 2 can be prevented to such an extent that the laser oscillation does not become unstable.

The error $\Delta\Psi$ of the installation angle of the half-wave plate is preferably 0.5 deg or less, and more preferably 0.2 deg or less, and is allowed as an assembly error. Therefore, when the error $\Delta\Psi$ has the above values, the laser interferometer 1 having excellent manufacturability can be implemented.

1.3.2. Calculation Examples 2 to 6

Calculation Examples 2 to 6 will be described as examples when the light intensity Pr calculated by the above-described equation (19) satisfies the equation (17). Parameters and calculation results of Calculation Examples 1 to 6 are as shown in Table 2.

mm, and the error $\Delta\Psi$ of the installation angle of the half-wave plate is reduced to 1.0 deg, the calculation result of $P_r/P_0$ is less than $1\times10^{-6}$.

In Calculation Example 5, as shown in Table 2, when the diameter $\varphi_{pin}$ of the opening 172 of the light shielding element 17 is set to 6.0 mm, the distance $x_{LD}$ between the collimator lens 3 and the laser light source 2 is set to 45.0 mm, and the error $\Delta\Psi$ of the installation angle of the half-wave plate is reduced to 0.2 deg, the calculation result of $P_r/P_0$ is less than $1\times10^{-6}$.

In Calculation Example 6, as shown in Table 2, when the diameter $\varphi_{pin}$ of the opening 172 of the light shielding element 17 is set to 10.0 mm, the distance $x_{LD}$ between the collimator lens 3 and the laser light source 2 is set to 70.0 mm, and the error $\Delta\Psi$ of the installation angle of the half-wave plate is reduced to 0.2 deg, the calculation result of $P_r/P_0$ is less than $1\times10{-6}$ Therefore, in Calculation Examples 2 to 6, by satisfying $0.10 \leq \varphi_{pin} \leq 10.0$, the incidence of the return light L5 on the laser light source 2 can be prevented to such the extent that the laser oscillation does not become unstable.

1.4. Effects of First Embodiment

TABLE 2

| | | Unit | Calculation Example 1 | Calculation Example 2 | Calculation Example 3 | Calculation Example 4 | Calculation Example 5 | Calculation Example 6 |
|---|---|---|---|---|---|---|---|---|
| Parameters | Diameter $\varphi_{pin}$ | mm | 0.10 | 0.40 | 2.00 | 2.00 | 6.00 | 10.0 |
| | Diffusion Radiation Angle θ | deg | 20 | 20 | 20 | 20 | 20 | 20 |
| | Wavelength λ | nm | 850 | 850 | 850 | 850 | 850 | 850 |
| | Light Diameter $R_{LD}$ | μm | 2.435 | 2.435 | 2.435 | 2.435 | 2.435 | 2.435 |
| | Distance $x_{LD}$ | mm | 4.0 | 4.0 | 15.0 | 45.0 | 45.0 | 70.0 |
| | Light Diameter R | mm | 1.40 | 1.40 | 5.24 | 15.71 | 15.71 | 24.43 |
| | Distance L | mm | 80.0 | 80.0 | 80.0 | 80.0 | 80.0 | 80.0 |
| | Light Reflectance $Refl_M$ | % | 30 | 30 | 30 | 30 | 30 | 30 |
| | Light Reflectance $Refl_S$ | % | 80 | 80 | 80 | 80 | 80 | 80 |
| | Distance $L_{pin}$ | mm | 8.0 | 8.0 | 8.0 | 8.0 | 10.0 | 10.0 |
| | Light Diameter $R_{pin}$ | mm | 1.39 | 0.72 | 2.06 | 2.06 | 6.02 | 10.01 |
| | Error Δψ | deg | 1.0 | 0.2 | 0.2 | 1.0 | 0.2 | 0.2 |
| Evaluation Result | Ratio $P_r/P_0$ | — | $3.53 \times 10^{-7}$ | $5.63 \times 10^{-7}$ | $7.24 \times 10^{-7}$ | $7.24 \times 10^{-7}$ | $6.88 \times 10^{-7}$ | $8.84 \times 10^{-7}$ |

In Calculation Example 2, as shown in Table 2, when the diameter $\varphi_{pin}$ of the opening 172 of the light shielding element 17 is set to 0.4 mm, the distance $x_{LD}$ between the collimator lens 3 and the laser light source 2 is set to 4.0 mm, and the error $\Delta\Psi$ of the installation angle of the half-wave plate is reduced to 0.2 deg, the calculation result of $P_r/P_0$ is less than $1\times10^{-6}$.

In Calculation Example 3, as shown in Table 2, when the diameter $\varphi_{pin}$ of the opening 172 of the light shielding element 17 is set to 2.0 mm, the distance $x_{LD}$ between the collimator lens 3 and the laser light source 2 is set to 15.0 mm, and the error $\Delta\Psi$ of the installation angle of the half-wave plate is reduced to 0.2 deg, the calculation result of $P_r/P_0$ is less than $1\times10^{-6}$.

In Calculation Example 4, as shown in Table 2, when the diameter $\varphi_{pin}$ of the opening 172 of the light shielding element 17 is set to 2.0 mm, the distance $x_{LD}$ between the collimator lens 3 and the laser light source 2 is set to 45.0

As described above, the laser interferometer 1 according to the present embodiment includes the laser light source 2, the light shielding element 17, the optical modulator 12, and the light receiving element 10. The laser light source 2 emits the emission light L1 (laser light). The light shielding element 17 has the opening 172 through which the emission light L1 passes. The optical modulator 12 modulates the emission light L1 into the reference light L2 having a different frequency. The light receiving element 10 receives the object light L3 generated by reflecting the emission light L1 by the object to be measured 14 and the reference light L2, and outputs the light receiving signal. The laser interferometer 1 satisfies $0.10 \leq \varphi_{pin} \leq 10.0$, in which $\varphi_{pin}$ [mm] is the diameter of the opening 172.

According to such a configuration, the light intensity of the return light L5 that is incident on the laser light source 2 can be sufficiently reduced by appropriately selecting the diameter $\varphi_{pin}$ within the above range according to other parameters. Accordingly, the laser oscillation in the laser light source 2 can be stabilized. As a result, since a quality of the emission light L1 is stabilized, it is possible to prevent a decrease in the accuracy of demodulating the sample signal from the light receiving signal in the demodulation circuit 52.

In the present embodiment, the emission light L1 and the return light L5 have a coaxial relationship with each other. Therefore, as compared to a case to be described later in which the emission light L1 and the return light L5 have a non-coaxial relationship with each other, an adjustment work of the laser interferometer 1 is easily performed, and a working distance of the laser interferometer 1, that is, a distance to the object to be measured 14 that can be measured by the laser interferometer 1 can be ensured to be relatively long. Therefore, according to the present embodiment, it is possible to implement the laser interferometer 1 that has a good measurement accuracy of the displacement and the speed of the object to be measured 14 and has an excellent operability.

The diameter $\varphi_{pin}$ of the opening 172 preferably satisfies $0.10 \leq \varphi_{pin} \leq 6.00$, more preferably satisfies $0.30 \leq \varphi_{pin} \leq 3.00$, and still more preferably satisfies $0.30 \leq \varphi_{pin} \leq 1.00$.

When the diameter $\varphi_{pin}$ of the opening 172 is less than the lower limit value described above, the light intensity of the emission light L1 passing through the opening 172 becomes extremely small. Accordingly, an S/N ratio in the light receiving signal decreases, and the measurement accuracy of the displacement and the speed of the object to be measured 14 decreases. On the other hand, when the diameter $\varphi_{pin}$ of the opening 172 exceeds the upper limit value described above, the light intensity that can be reduced by the light shielding element 17 becomes small. Therefore, the light intensity of the return light L5 that is incident on the laser light source 2 cannot be sufficiently reduced.

The emission light L1 (laser light) that is incident on the optical modulator 12 may be non-collimated light, and is the collimated light in the present embodiment.

Accordingly, it is possible to prevent an increase in sizes of the optical modulator 12 and the polarization beam splitter 4, and the size and the weight of the laser interferometer 1 can be reduced. In addition, an increase in the light diameter of the emission light L1 is prevented, and the S/N ratio in the light receiving signal is easily increased.

The light intensity distribution in the cross section of the collimated light may be any distribution, and is preferably the Gaussian distribution. When the standard deviation of the Gaussian distribution is σ [mm], the diameter $\varphi_{pin}$ [mm] of the opening 172 preferably satisfies $0.5\sigma \leq \varphi_{pin}/2 \leq 3.0\sigma$. In this case, about 10% to 99% of the light intensity of the emission light L1 emitted from the laser light source 2 passes through the opening 172. The diameter $\varphi_{pin}$ [mm] of the opening 172 more preferably satisfies $1.0\sigma \leq \varphi_{pin}/2 \leq 3.0\sigma$. In this case, about 40% to 99% of the light intensity of the emission light L1 emitted from the laser light source 2 passes through the opening 172. As a result of setting the diameter $\varphi_{pin}$ [mm] of the opening 172 within such a range, it is possible to ensure the necessary and sufficient light intensity for the emission light L1 passing through the opening 172. As a result, it is possible to prevent the decrease in the S/N ratio in the light receiving signal, and to prevent the decrease in the measurement accuracy of the displacement and the speed of the object to be measured 14.

The distance $x_{LD}$ between the collimator lens 3 and the laser light source 2 corresponds to a focal length of the collimator lens 3. The distance $x_{LD}$ is preferably 1.5 mm or more and 70.0 mm or less, and more preferably 2.5 mm or more and 45.0 mm or less. In particular, when the diameter $\varphi_{pin}$ of the opening 172 is 2 mm or more, the distance $x_{LD}$ is preferably 15.0 mm or more and 45.0 mm or less. Accordingly, an allowable range of the error $\Delta\Psi$ can be further expanded.

A distance L between the collimator lens 3 and the optical modulator 12 is preferably 5.0 mm or more and 200 mm or less, and more preferably 10.0 mm or more and 100 mm or less. Accordingly, it is possible to ensure the sufficient working distance while preventing the increase in the size of the optical system 50.

Further, a distance $L_{pin}$ between the collimator lens 3 and the light shielding element 17 is preferably 0.5 mm or more and 15.0 mm or less, and more preferably 1.0 mm or more and 10.0 mm or less. Accordingly, it is possible to effectively function the light shielding element 17 while avoiding the increase in the size of the optical system 50.

2. Second Embodiment

Next, a laser interferometer according to a second embodiment will be described.

Figure 14:
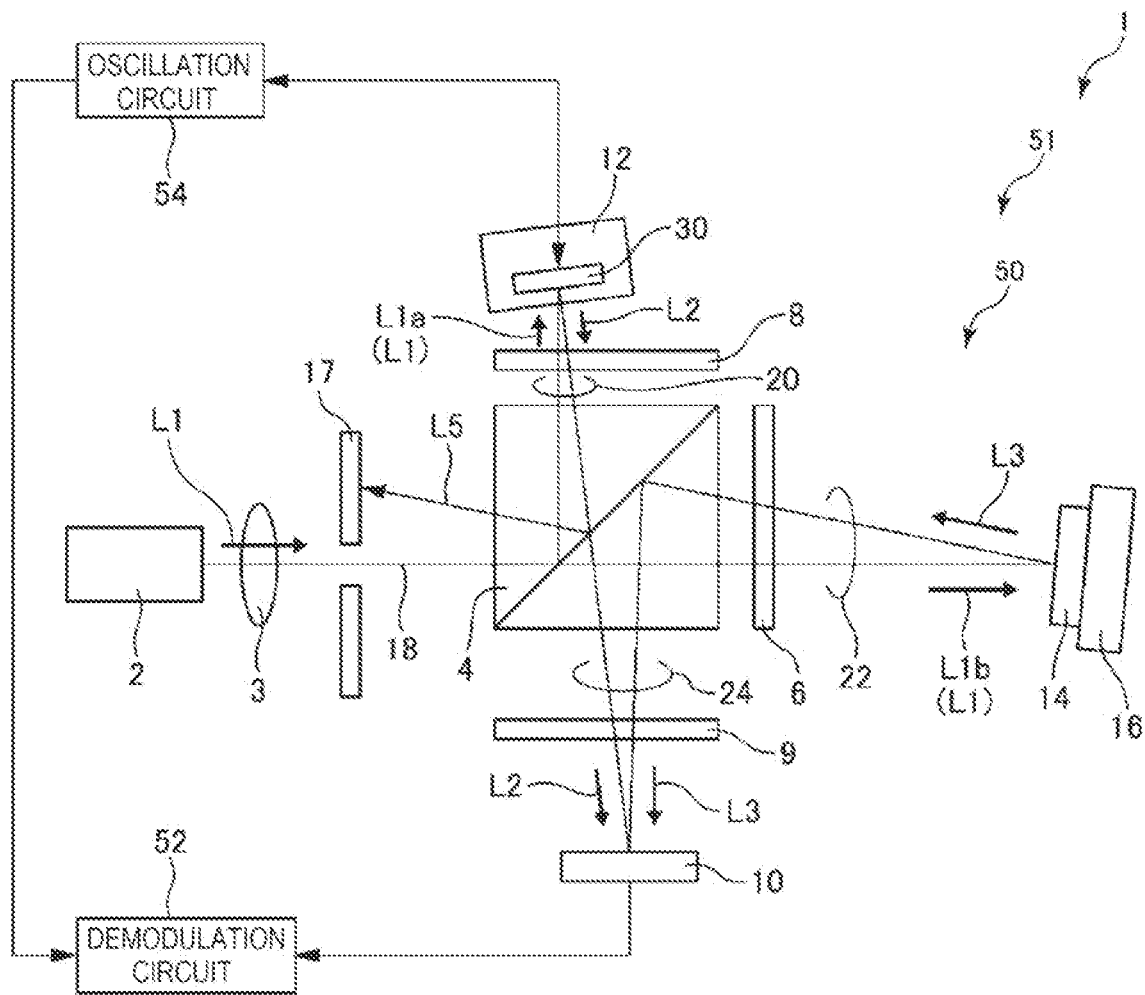
FIG. 14 is a schematic configuration diagram showing a sensor head unit of a laser interferometer according to a second embodiment.
Figure 15:
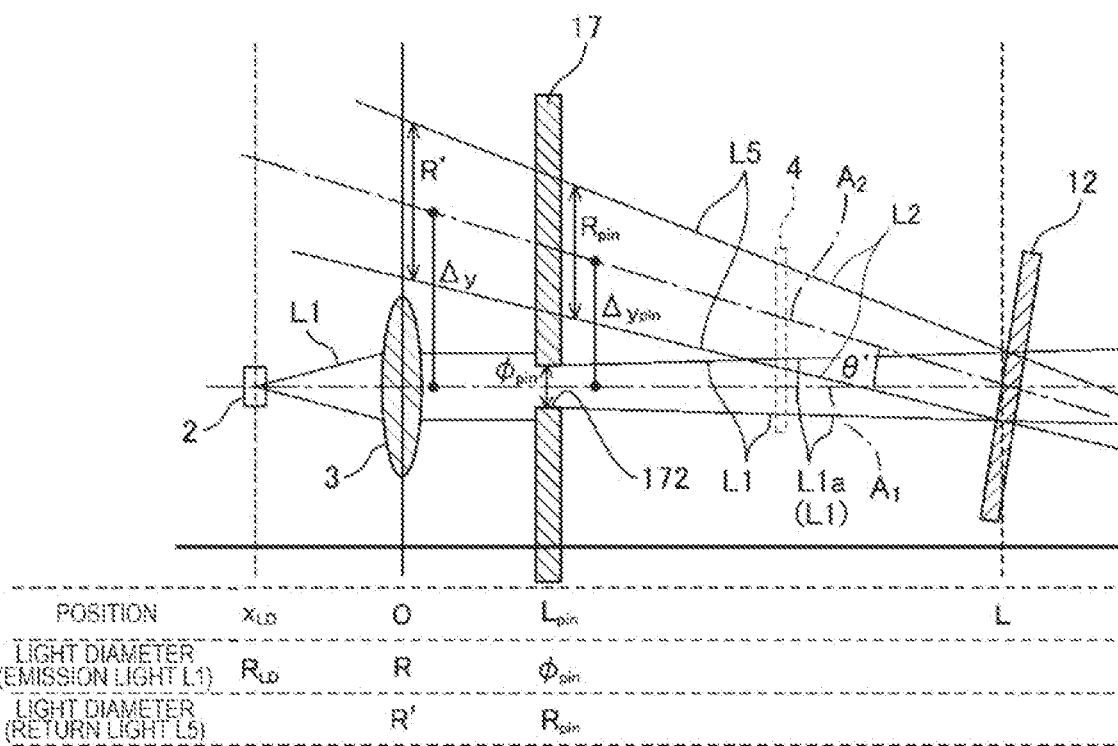
FIG. 15 is a schematic diagram showing a light trace of emission light L1 emitted from a laser light source shown in FIG. 14 and a light trace when the reference light L2 generated by reflecting the emission light L1 by the optical modulator is directed to the laser light source as the return light L5.

FIG. 14 is a schematic configuration diagram showing a sensor head unit of the laser interferometer 1 according to the second embodiment. FIG. 15 is a schematic diagram showing a light trace of the emission light L1 emitted from the laser light source 2 shown in FIG. 14 and a light trace when the reference light L2 generated by reflecting the emission light L1 by the optical modulator 12 travels to the laser light source 2 as the return light L5.

Hereinafter, the second embodiment will be described. In the following description, differences from the first embodiment will be mainly described, and description of the same matters will be omitted. In the drawings, the same components as those of the first embodiment are denoted by the same reference numerals.

2.1. Prevention of Return Light by Light Shielding Element and Optical Axis Shift In the first embodiment described above, the emission light L1 and the return light L5 have a coaxial relationship with each other. In contrast, in the second embodiment, the emission light L1 and the return light L5 have a non-coaxial relationship with each other. Specifically, as shown in FIGS. 14 and 15, the optical modulator 12 is tilted such that an optical axis of the reference light L2 generated by the optical modulator 12 is shifted from an optical axis of the reflection light L1a (emission light L1) that is incident on the optical modulator 12. Accordingly, even when a part of the reference light L2 is reflected again by the polarization beam splitter 4 and the return light L5 is generated, the optical axis (first optical axis $A_1$) of the emission light L1 and the optical axis (second optical axis $A_2$) of the return light L5 derived from the reference light L2, which are collimated light, have the non-coaxial relationship with each other. As a result, it is possible to prevent the return light L5 from being incident on the laser light source 2. In the present specification, shifting the first optical axis $A_1$ and the second optical axis $A_2$ is referred to as an "optical axis shift". The first optical axis $A_1$ is the optical axis of the emission light L1, and the second optical axis $A_2$ is the optical axis of the reference light L2 and the optical axis of the return light L5 derived from the reference light L2. In addition to being located within a plane in which the optical system 50 is spread as shown in FIG. 2, a direction in which the optical axis is shifted may be a direction intersecting with the plane.

As a result of the optical axis shift, a shift occurs between the first optical axis $A_1$ and the second optical axis $A_2$ at a position of the collimator lens 3. In FIG. 15, a shift width between the first optical axis $A_1$ and the second optical axis $A_2$ in the collimator lens 3 is $\Delta y$ [mm]. In FIG. 15, an angle formed by the first optical axis $A_1$ and the second optical axis $A_2$ is a shift angle $\theta'$. Further, a distance between a center of the collimator lens 3 and the optical modulator 12 is set to L. Then, the shift width $\Delta y$ is expressed by the following equation (21).

$$\Delta y = L \tan \theta' \tag{21}$$

Meanwhile, the shift angle $\theta'$ is normally $\theta' \ll 1$. Therefore, the above-described equation (21) is transformed into the following equation (22).

$$\Delta y \cong L\theta' \tag{22}$$

In consideration of the shift width $\Delta y$ obtained in this manner, the equation (19) in the first embodiment is replaced by the following equation (23).

$$P_r = P'_r \iint_{\text{Within circle having diameter } \varphi_{pin}} \exp\left\{-2\frac{x^2 + (y - \Delta y)^2}{w'^2}\right\} dx dy \tag{23}$$

$$w' = \frac{1}{3} R_{pin} = \frac{\phi_{pin}}{3} + \frac{2(L - L_{pin})}{3\phi_{pin}} \lambda \tag{23-1}$$

In the above-described equation (23-1), $R_{pin}$ is a light diameter of the return light L5 in the light shielding element 17, and $L_{pin}$ is a distance between the center of the collimator lens 3 and a center of the light shielding element 17.

Therefore, the diameter $\varphi_{pin}$ and the shift width $\Delta y$ of the opening 172 of the light shielding element 17 may be selected such that the light intensity Pr calculated by the above-described equation (23) satisfies the equation (17). Accordingly, the laser interferometer 1 in which laser oscillation is stabilized can be implemented.

The diameter $\varphi_{pin}$ of the opening 172 of the light shielding element 17 is the same as that in the first embodiment.

Meanwhile, the shift width $\Delta y$ [mm] preferably satisfies a relationship of the following equation (24).

$$0.10 \leq \Delta y \leq 10.0 \tag{24}$$

When the shift width $\Delta y$ is within this range, most of the return light L5 can be shielded by the light shielding element 17. Accordingly, the light intensity of the return light L5 reaching the laser light source 2 can be reduced, and the laser oscillation can be prevented from becoming unstable.

2.1.1. Calculation Example 7

Calculation Example 7 will be described as an example when the light intensity $P_r$ calculated by the above-described equation (23) satisfies the equation (17).

Parameters and a calculation result of Calculation Example 7 are as shown in Table 3.

TABLE 3

| Calculation Example 7 | | Value | Unit |
|---|---|---|---|
| Parameters | Diameter (Ppin of Opening 172 of Light shielding element 17 | 0.50 | mm |
| | Shift Width $\Delta y$ of Return Light L5 in Collimator Lens 3 | 0.10 | mm |
| | Shift Angle $\theta'$ | 0.072 | deg |
| | Diffusion Radiation Angle 8 of Emission Light L1 | 20 | deg |
| | Wavelength $\lambda$ of Emission Light L1 | 850 | nm |
| | Light Diameter $R_{LD}$ of Laser Light Source 2 | 2.435 | pm |
| | Distance $X_{LD}$ between Collimator Lens 3 and Laser Light Source 2 | 4.0 | mm |
| | Light Diameter R of Emission Light L1 Passing Through Collimator Lens 3 | 1.40 | mm |
| | Distance L Between Collimator Lens 3 and Optical Modulator 12 | 80.0 | mm |
| | Light Reflectance $Refl_M$ of Optical Modulator 12 | 30 | % |
| | Light Reflectance $Refl_S$ of Object To Be Measured 14 | 80 | % |
| | Distance $L_{pin}$ between Collimator Lens 3 and Light shielding element 17 | 8.0 | mm |
| | Light Diameter $R_{pin}$ of Return Light L5 of Light shielding element 17 | 0.76 | mm |
| | Error $\Delta_\psi$ of Installation Angle of Half-Wave Plate Formed by Two Quarter-Wave Plates 6 and 8 | 0.2 | deg |
| Calculation Result | Ratio $P_r/P_0$ of Light Intensity $P_r$ of Return Light L5 not Shielded By Light shielding element 17 To Light Intensity $P_0$ of Emission Light L1 | $9.61 \times 10^{-7}$ | — |

In Calculation Example 7, as shown in Table 3, when the diameter $\varphi_{pin}$ of the opening 172 of the light shielding element 17 is set to 0.50 mm ($\approx 0.7\sigma$), the shift width $\Delta y$ of the return light L5 in the collimator lens 3 is set to 0.10 mm, the distance $x_{LD}$ between the collimator lens 3 and the laser light source 2 is set to 4.0 mm, and the error $\Delta\Psi$ of an installation angle of the half-wave plate is reduced to 0.2 deg, the calculation result of $P_r/P_0$ is less than $1\times 10^{-6}$. Therefore, in Calculation Example 7, incidence of the return light L5 on the laser light source 2 can be prevented to such an extent that the laser oscillation does not become unstable.

2.1.2. Calculation Examples 8 to 16

Calculation Examples 8 to 16 will be described as examples when the light intensity $P_r$ calculated by the above-described equation (23) satisfies the equation (17). Parameters and calculation results of Calculation Examples 7 to 16 are as shown in Table 4.

TABLE 4

| | | Unit | Calculation Example 7 | Calculation Example 8 | Calculation Example 9 | Calculation Example 10 | Calculation Example 11 |
|---|---|---|---|---|---|---|---|
| Parameters | Diameter $\varphi_{pin}$ | mm | 0.50 | 2.10 | 0.70 | 2.10 | 1.60 |
| | Shift Width $\Delta y$ | mm | 0.10 | 1.80 | 0.75 | 2.30 | 1.40 |
| | Shift Angle $\theta'$ | deg | 0.072 | 1.290 | 0.537 | 1.647 | 6.685 |
| | Diffusion Radiation Angle $\theta$ | deg | 20 | 20 | 20 | 20 | 20 |
| | Wavelength $\lambda$ | nm | 850 | 850 | 850 | 850 | 850 |
| | Light Diameter $R_{LD}$ | μm | 2.435 | 2.435 | 2.435 | 2.435 | 2.435 |
| | Distance $x_{LD}$ | mm | 4.0 | 4.0 | 4.0 | 4.0 | 3.0 |
| | Light Diameter R | mm | 1.40 | 1.40 | 1.40 | 1.40 | 1.05 |
| | Distance L | mm | 80.0 | 80.0 | 80.0 | 80.0 | 12.0 |
| | Light Reflectance $Refl_M$ | % | 30 | 30 | 30 | 30 | 30 |
| | Light Reflectance $Refl_S$ | % | 80 | 80 | 80 | 80 | 80 |
| | Distance $L_{pin}$ | mm | 8.0 | 8.0 | 8.0 | 8.0 | 1.0 |
| | Light Diameter $R_{pin}$ | mm | 0.76 | 2.16 | 0.88 | 2.16 | 1.61 |
| | Error $\Delta\psi$ | deg | 0.2 | 0.2 | 1.0 | 1.0 | 0.2 |
| Evaluation Result | Ratio $P_r/P_0$ | — | — | $9.61 \times 10^{-7}$ | $9.61 \times 10^{-7}$ | $5.03 \times 10^{-7}$ | $6.01 \times 10^{-7}$ | $3.96 \times 10^{-7}$ |

| | | Unit | Calculation Example 12 | Calculation Example 13 | Calculation Example 14 | Calculation Example 15 | Calculation Example 16 |
|---|---|---|---|---|---|---|---|
| Parameters | Diameter $\varphi_{pin}$ | mm | 0.40 | 0.53 | 1.90 | 6.00 | 10.0 |
| | Shift Width $\Delta y$ | mm | 0.10 | 0.50 | 2.10 | 2.00 | 3.50 |
| | Shift Angle $\theta'$ | deg | 0.477 | 2.387 | 10.03 | 1.433 | 2.507 |
| | Diffusion Radiation Angle $\theta$ | deg | 20 | 20 | 20 | 20 | 20 |
| | Wavelength $\lambda$ | nm | 850 | 850 | 850 | 850 | 850 |
| | Light Diameter $R_{LD}$ | μm | 2.435 | 2.435 | 2.435 | 2.435 | 2.435 |
| | Distance $x_{LD}$ | mm | 3.0 | 3.0 | 3.0 | 40 | 65 |
| | Light Diameter R | mm | 1.05 | 1.05 | 1.05 | 13.96 | 22.69 |
| | Distance L | mm | 12.0 | 12.0 | 12.0 | 80.0 | 80.0 |
| | Light Reflectance $Refl_M$ | % | 30 | 30 | 30 | 30 | 30 |
| | Light Reflectance $Refl_S$ | % | 80 | 80 | 80 | 80 | 80 |
| | Distance $L_{pin}$ | mm | 1.0 | 1.0 | 1.0 | 10.0 | 10.0 |
| | Light Diameter $R_{pin}$ | mm | 0.45 | 0.57 | 1.91 | 6.02 | 10.01 |
| | Error $\Delta\psi$ | deg | 0.2 | 1.0 | 1.0 | 0.2 | 0.2 |
| Evaluation Result | Ratio $P_r/P_0$ | — | $7.42 \times 10^{-7}$ | $8.10 \times 10^{-7}$ | $4.89 \times 10^{-7}$ | $8.41 \times 10^{-7}$ | $8.87 \times 10^{-7}$ |

In Calculation Example 8, as shown in Table 4, when the diameter $\varphi_{pin}$ in of the opening 172 of the light shielding element 17 is set to 2.10 mm (≈3.0σ), the shift width Δy of the return light L5 in the collimator lens 3 is set to 1.80 mm, the distance $x_{LD}$ between the collimator lens 3 and the laser light source 2 is set to 4.0 mm, and the error ΔΨ of the installation angle of the half-wave plate is reduced to 0.2 deg, the calculation result of $P_r/P_0$ is less than $1\times10^{-6}$.

In addition, in Calculation Examples 7 and 8, in particular, it is supported that the ratio $P_r/P_0$ satisfies the relationship of the equation (17) by setting the diameter $\varphi_{pin}$ of the opening 172 to $0.5\sigma \leq \varphi_{pin}/2 \leq 3.0\sigma$ and setting the shift width Δy to 0.10 mm≤Δy≤10.0 mm.

In Calculation Example 9, as shown in Table 4, when the diameter $\varphi_{pin}$ of the opening 172 of the light shielding element 17 is set to 0.70 mm (≈1.0σ), the shift width Δy of the return light L5 in the collimator lens 3 is set to 0.75 mm, the distance $x_{LD}$ between the collimator lens 3 and the laser light source 2 is set to 4.0 mm, and the error ΔΨ of the installation angle of the half-wave plate is reduced to 1.0 deg, the calculation result of $P_r/P_0$ is less than $1\times10^{-6}$.

In Calculation Example 10, as shown in Table 4, when the diameter $\varphi_{pin}$ of the opening 172 of the light shielding element 17 is set to 2.10 mm (≈3.0σ), the shift width Δy of the return light L5 in the collimator lens 3 is set to 2.30 mm, the distance $x_{LD}$ between the collimator lens 3 and the laser light source 2 is set to 4.0 mm, and the error ΔΨ of the installation angle of the half-wave plate is reduced to 1.0 deg, the calculation result of $P_r/P_0$ is less than $1\times10^{-6}$.

In addition, in Calculation Examples 9 and 10, in particular, by setting the diameter $\varphi_{pin}$ of the opening 172 to $1.0\sigma \leq \varphi_{pin}/2 \leq 3.0\sigma$ and setting the shift width Δy to 0.70 mm≤Δy≤10.0 mm, it is supported that the ratio $P_r/P_0$ satisfies the relationship of the equation (17) even when the error ΔΨ is allowed up to 1.0 deg.

In Calculation Example 11, as shown in Table 4, when the diameter $\varphi_{pin}$ of the opening 172 of the light shielding element 17 is set to 1.60 mm (≈3.0σ), the shift width Δy of the return light L5 in the collimator lens 3 is set to 1.40 mm, the distance $x_{LD}$ between the collimator lens 3 and the laser light source 2 is set to 3.0 mm, and the error ΔΨ of the installation angle of the half-wave plate is reduced to 0.2 deg, the calculation result of $P_r/P_0$ is less than $1\times10^{-6}$.

In Calculation Example 12, as shown in Table 4, when the diameter $\varphi_{pin}$ of the opening 172 of the light shielding element 17 is set to 0.40 mm (≈0.7σ), the shift width Δy of the return light L5 in the collimator lens 3 is set to 0.10 mm, the distance $x_{LD}$ between the collimator lens 3 and the laser light source 2 is set to 3.0 mm, and the error ΔΨ of the installation angle of the half-wave plate is reduced to 0.2 deg, the calculation result of $P_r/P_0$ is less than $1\times10^{-6}$.

In addition, in Calculation Examples 11 and 12, in particular, by setting the diameter $\varphi_{pin}$ of the opening 172 to $0.5\sigma \leq \varphi_{pin}/2 \leq 3.0\sigma$ and setting the shift width Δy to 0.70 mm≤Δy≤10.0 mm, it is supported that the ratio $P_r/P_0$ satisfies the relationship of the equation (17) even when the distance L and the distance $L_{pin}$ are shortened. Accordingly, a volume of the sensor head unit 51 of the laser interferometer 1 can be reduced to, for example, about 10 cc or less. As a result, it is possible to particularly reduce the size of the laser interferometer 1.

In Calculation Example 13, as shown in Table 4, when the diameter $\varphi_{pin}$ of the opening 172 of the light shielding element 17 is set to 0.53 mm (≈1.0σ), the shift width Δy of the return light L5 in the collimator lens 3 is set to 0.50 mm, the distance $x_{LD}$ between the collimator lens 3 and the laser light source 2 is set to 3.0 mm, and the error ΔΨ of the installation angle of the half-wave plate is reduced to 1.0 deg, the calculation result of $P_r/P_0$ is less than $1\times10^{-6}$.

In Calculation Example 14, as shown in Table 4, when the diameter $\varphi_{pin}$ of the opening 172 of the light shielding element 17 is set to 1.90 mm (≈3.0σ), the shift width Δy of the return light L5 in the collimator lens 3 is set to 2.10 mm, the distance $x_{LD}$ between the collimator lens 3 and the laser light source 2 is set to 3.0 mm, and the error ΔΨ of the installation angle of the half-wave plate is reduced to 1.0 deg, the calculation result of $P_r/P_0$ is less than $1\times10^{-6}$.

In addition, in Calculation Examples 13 and 14, in particular, by setting the diameter $\varphi_{pin}$ of the opening 172 to $1.0\sigma \leq \varphi_{pin}/2 \leq 3.0\sigma$ and setting the shift width Δy to 0.50 mm≤Δy≤10.0 mm, the error ΔΨ can be allowed up to 1.0 deg even when the volume of the sensor head unit 51 is reduced to, for example, about 10 cc or less.

In Calculation Example 15, as shown in Table 4, when the diameter $\varphi_{pin}$ of the opening 172 of the light shielding element 17 is set to 6.00 mm, the shift width Δy of the return light L5 in the collimator lens 3 is set to 2.00 mm, the distance $x_{LD}$ between the collimator lens 3 and the laser light source 2 is set to 40 mm, and the error ΔΨ of the installation angle of the half-wave plate is reduced to 0.2 deg, the calculation result of $P_r/P_0$ is less than $1\times10^{-6}$.

In Calculation Example 16, as shown in Table 4, when the diameter $\varphi_{pin}$ of the opening 172 of the light shielding element 17 is set to 10.0 mm, the shift width Δy of the return light L5 in the collimator lens 3 is set to 3.50 mm, the distance $x_{LD}$ between the collimator lens 3 and the laser light source 2 is set to 65 mm, and the error ΔΨ of the installation angle of the half-wave plate is reduced to 0.2 deg, the calculation result of $P_r/P_0$ is less than $1\times10^{-6}$.

Therefore, in Calculation Examples 7 to 16, by satisfying $0.10 \leq \varphi_{pin} \leq 10.0$, the incidence of the return light L5 on the laser light source 2 is prevented to such an extent that the laser oscillation does not become unstable.

2.2. Effects of Second Embodiment

As described above, in the laser interferometer 1 according to the present embodiment, the optical axis of the emission light L1, which is the collimated light, is defined as the "first optical axis $A_1$", and when the reference light L2 or the object light L3 is generated as the return light L5 traveling toward the laser light source 2, the optical axis of the return light L5 is defined as the "second optical axis $A_2$". Further, a position at which the collimated light is generated, that is, the center of the collimator lens 3 is set as a reference position, and a shift width between the first optical axis $A_1$ and the second optical axis $A_2$ at the reference position is Δy [mm]. In the laser interferometer 1 according to the present embodiment, the first optical axis $A_1$ and the second optical axis $A_2$ are shifted from each other so as to satisfy 0.10 Δy≤10.0.

According to such a configuration, the first optical axis $A_1$ of the emission light L1 and the second optical axis $A_2$ of the return light L5 have the non-coaxial relationship with each other. Accordingly, the second optical axis $A_2$ of the return light L5 is shifted from the center of the opening 172 of the light shielding element 17. As a result, even when the diameter $\varphi_{pin}$ of the opening 172 is not narrowed down, the return light L5 can be prevented from being incident on the laser light source 2. Therefore, according to the present embodiment, it is possible to stabilize the laser oscillation in the laser light source 2 while increasing an S/N ratio in a light receiving signal. As a result, a quality of the emission light L1 is stabilized, and it is possible to improve an accuracy of demodulating a sample signal from the light receiving signal in the demodulation circuit 52. Accordingly, a measurement accuracy of a displacement and a speed of the object to be measured 14 can be improved.

In addition, when the shift width Δy is within the above range, the error ΔΨ of the installation angle of the half-wave plate can be easily reduced to a range allowed as an assembly error. Therefore, the laser interferometer 1 having excellent manufacturability can be implemented.

The shift width Δy preferably satisfies 0.50≤Δy≤10.0, more preferably satisfies 2.10 ≤Δy≤10.0, and still more preferably satisfies 2.30 ≤Δy≤10.0. In consideration of a size of the sensor head unit 51, the upper limit value of the shift width Δy is more preferably 6.00 or less, and still more preferably 3.00 or less.

When the shift width Δy is less than the lower limit value described above, the light intensity of the return light L5 that is incident on the laser light source 2 may be increased, the allowable range of the error ΔΨ may be narrowed, and manufacturability of the optical system 50 may decrease. On the other hand, when the shift width Δy exceeds the upper limit value described above, since it is necessary to increase the size of the polarization beam splitter 4, the size of the sensor head unit 51 may be difficult to be reduced.

Further, the laser interferometer 1 according to the present embodiment includes the collimator lens 3. The collimator lens 3 is disposed between the laser light source 2 and the light shielding element 17. The collimator lens 3 collimates the emission light L1 (laser light) emitted from the laser light source 2 to generate the collimated light.

According to such a configuration, the collimated light can be generated even when a semiconductor laser element is used as the laser light source 2. Accordingly, it is possible to prevent an increase in a size of the polarization beam splitter 4, and a size and a weight of the laser interferometer 1 can be reduced. In addition, an increase in the light diameter of the emission light L1 is prevented, and the S/N ratio in the light receiving signal is easily increased.

3. First to Fifth Modifications of Laser Interferometer

Next, laser interferometers according to first to fifth modifications will be described.

Figure 16:
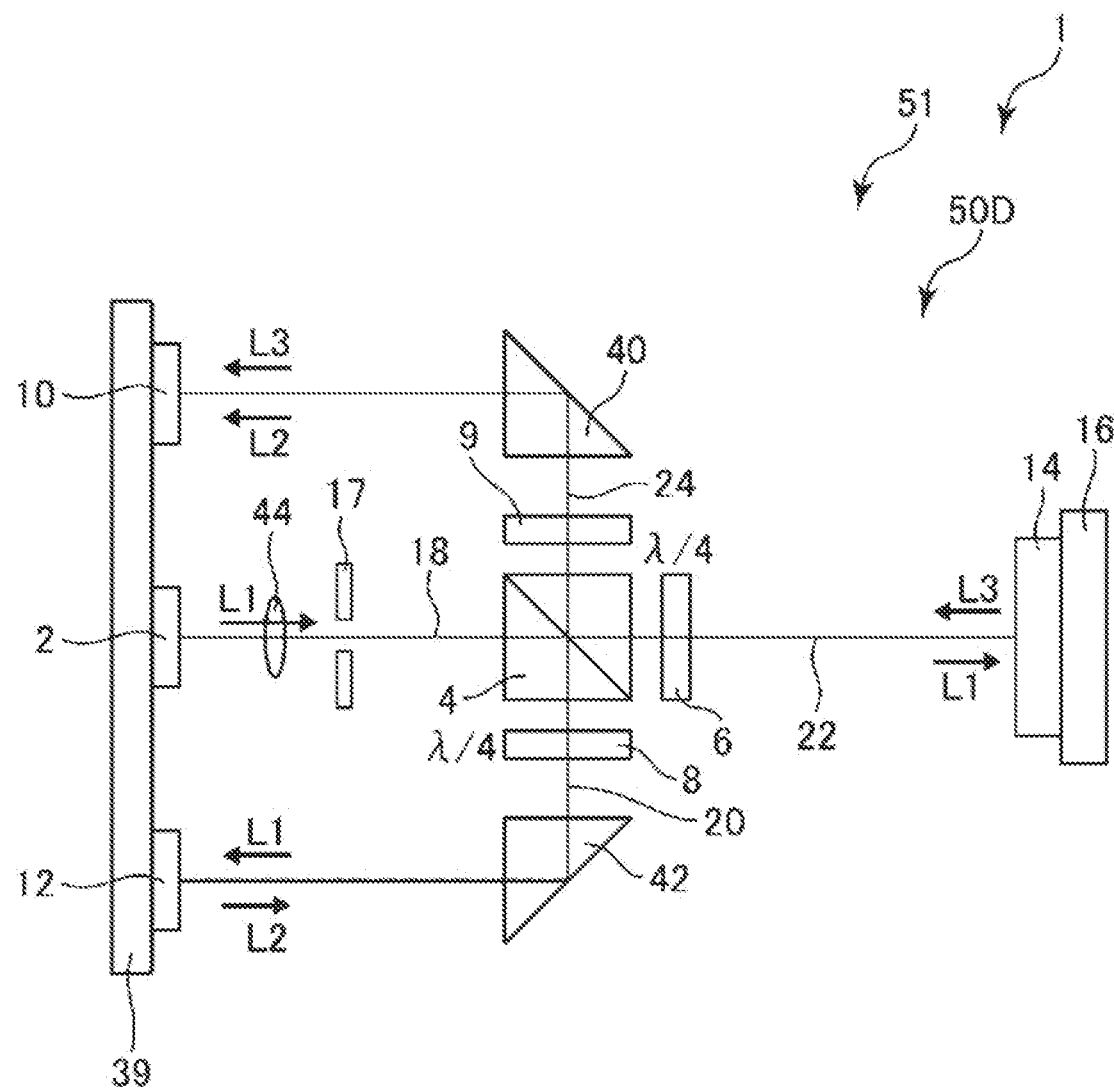
FIG. 16 is a schematic configuration diagram showing a mounting structure of an optical system included in a laser interferometer according to a first modification.
Figure 17:
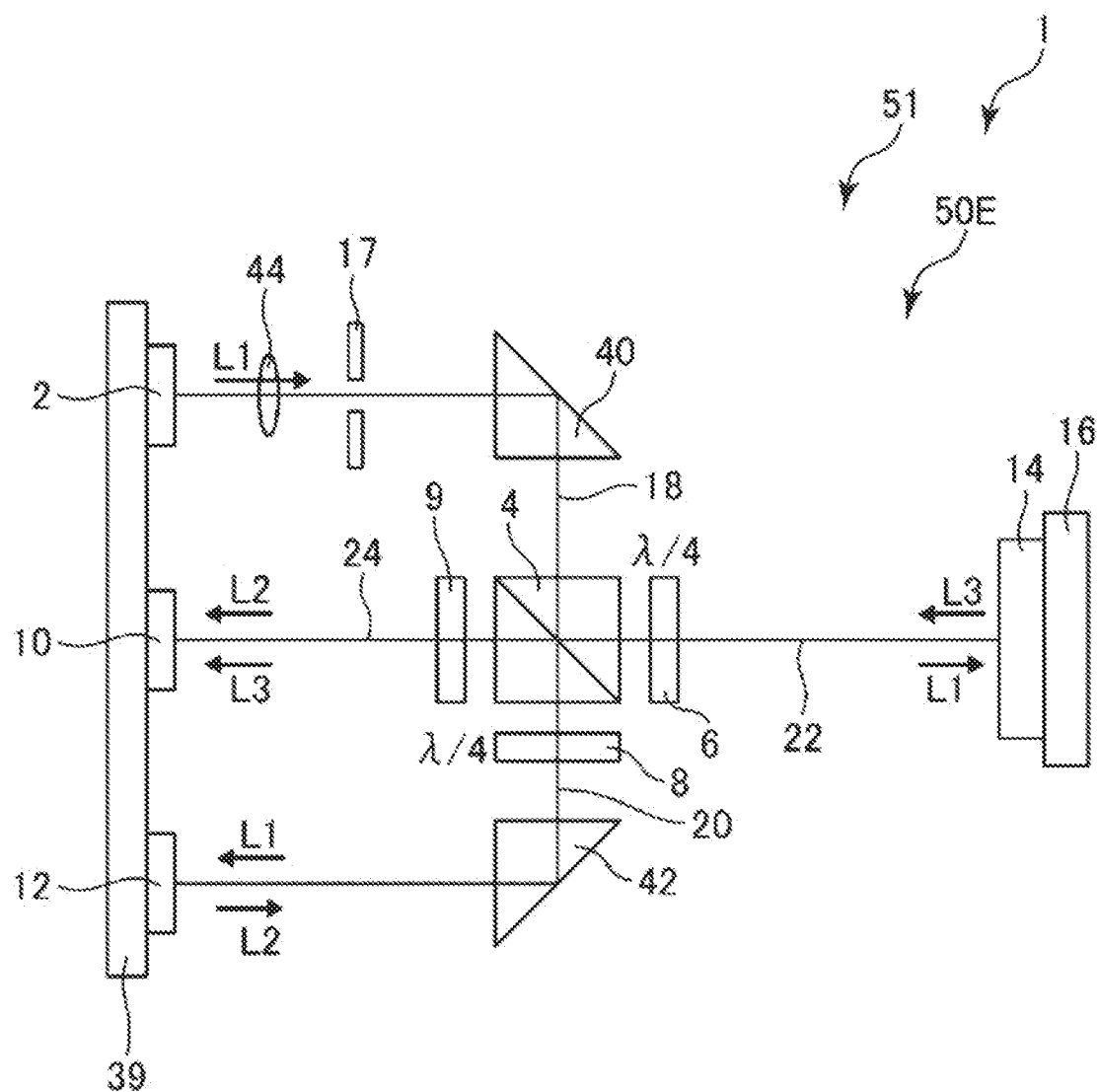
FIG. 17 is a schematic configuration diagram showing a mounting structure of an optical system included in a laser interferometer according to a second modification.
Figure 18:
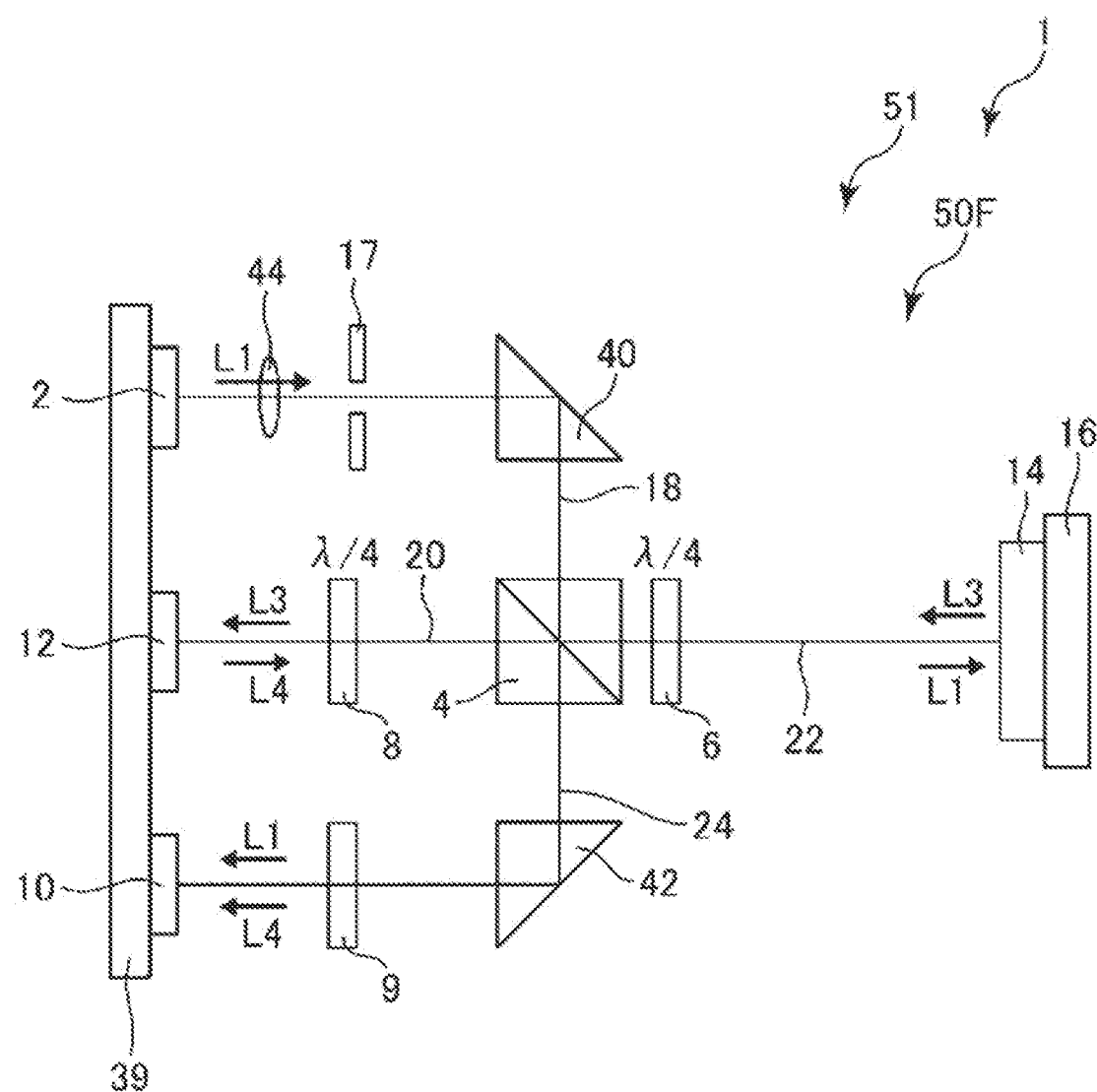
FIG. 18 is a schematic configuration diagram showing a mounting structure of an optical system included in a laser interferometer according to a third modification.
Figure 19:
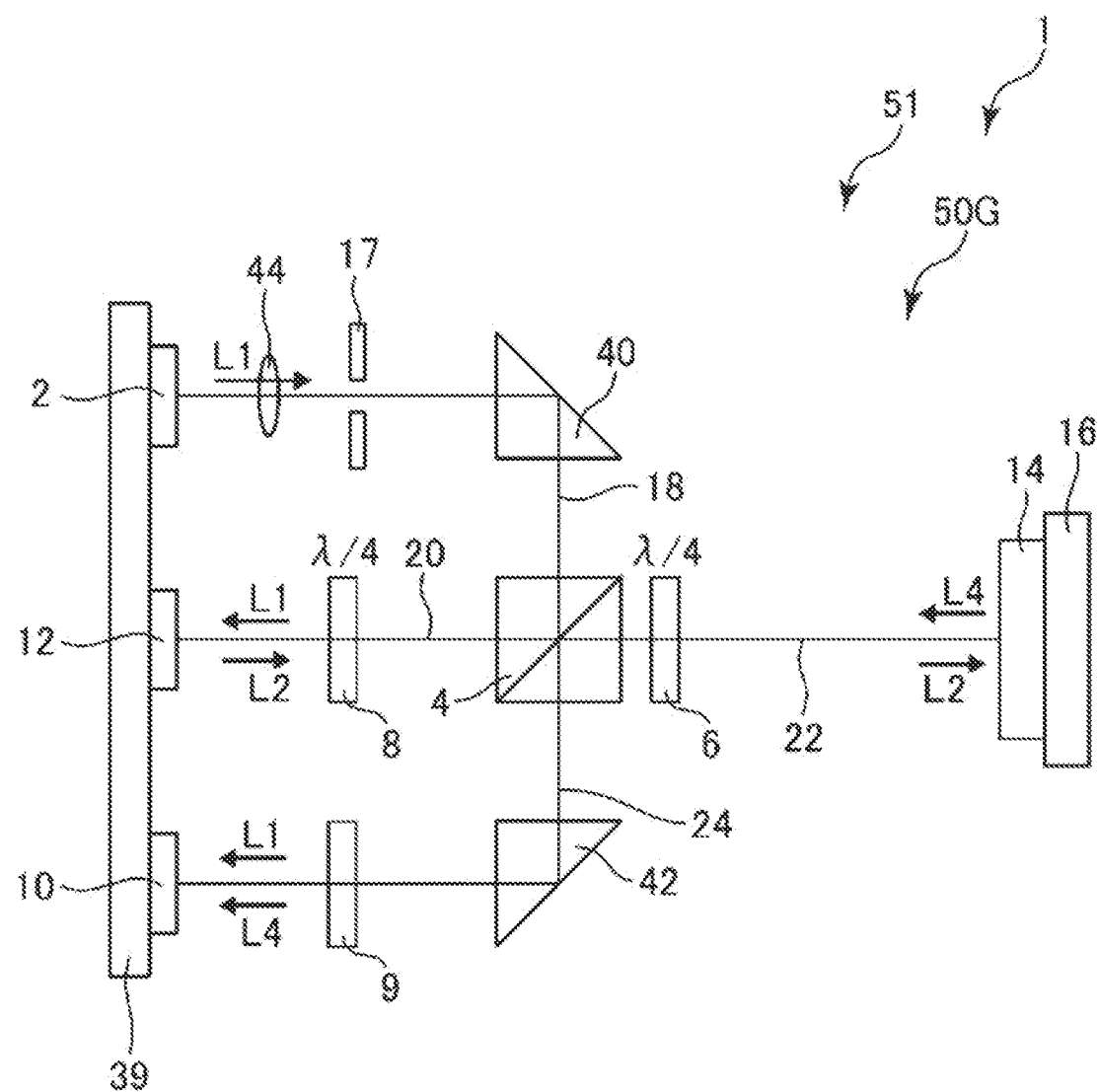
FIG. 19 is a schematic configuration diagram showing a mounting structure of an optical system included in a laser interferometer according to a fourth modification.

FIG. 16 is a schematic configuration diagram showing a mounting structure of an optical system included in a laser interferometer according to a first modification. FIG. 17 is a schematic configuration diagram showing a mounting structure of an optical system included in a laser interferometer according to a second modification. FIG. 18 is a schematic configuration diagram showing a mounting structure of an optical system included in a laser interferometer according to a third modification. FIG. 19 is a schematic configuration diagram showing a mounting structure of an optical system included in a laser interferometer according to a fourth modification.

Hereinafter, the first to fourth modifications will be described. In the following description, differences from the above-described embodiments will be mainly described, and description of the same matters will be omitted. In FIGS. 16 to 19, the same components as those of the above-described embodiments are denoted by the same reference numerals.

An optical system 50D of the laser interferometer 1 shown in FIG. 16 includes a substrate 39. The laser light source 2, the optical modulator 12, and the light receiving element 10 are mounted on the substrate 39. On the substrate 39 shown in FIG. 16, the light receiving element 10, the laser light source 2, and the optical modulator 12 are disposed in this order along a direction orthogonal to the optical path 22.

The optical system 50D shown in FIG. 16 includes prisms 40 and 42. The prism 40 is provided on the optical path 24 between the light receiving element 10 and the analyzer 9. The prism 42 is provided on the optical path 20 between the optical modulator 12 and the quarter-wave plate 8.

The optical system 50D shown in FIG. 16 further includes a collimator lens 44. The collimator lens 44 is provided on the optical path 18 between the laser light source 2 and the polarization beam splitter 4.

The same effects as those of the above-described embodiments can be obtained also in the first modification as described above.

An optical system 50E of the laser interferometer 1 shown in FIG. 17 is the same as the optical system 50D shown in FIG. 16 except for an arrangement of elements and the like.

On the substrate 39 shown in FIG. 17, the laser light source 2, the light receiving element 10, and the optical modulator 12 are disposed in this order along a direction orthogonal to the optical path 22. The prism 40 is provided on the optical path 18, and the prism 42 is provided on the optical path 20.

The same effects as those of the above-described embodiments can be obtained also in the second modification as described above.

An optical system 50F of the laser interferometer 1 shown in FIG. 18 is the same as the optical system 50E shown in FIG. 17 except that the arrangement of elements and the like is different and laser light received by the light receiving element 10 is different.

On the substrate 39 shown in FIG. 18, the laser light source 2, the optical modulator 12, and the light receiving element 10 are disposed in this order along a direction orthogonal to the optical path 22. The prism 42 is provided on the optical path 24.

The emission light L1 emitted from the laser light source 2 passes through the prism 40 and is split into two beams by the polarization beam splitter 4. The emission light L1 reflected by the polarization beam splitter 4 is incident on the object to be measured 14 in a moving state through the quarter-wave plate 6. The emission light L1 is subjected to a Doppler shift at the object to be measured 14, and is reflected as the object light L3. The object light L3 is incident on the optical modulator 12 through the quarter-wave plate 6, the polarization beam splitter 4, and the quarter-wave plate 8. The object light L3 is subjected to a frequency shift by the optical modulator 12 and is reflected as object reference light L4. The object reference light L4 is incident on the light receiving element 10 through the quarter-wave plate 8, the polarization beam splitter 4, the prism 42, and the analyzer 9.

Meanwhile, the emission light L1 transmitted through the polarization beam splitter 4 is incident on the light receiving element 10 through the prism 42 and the analyzer 9.

Then, the object reference light L4 and the emission light L1 are incident on the light receiving element 10 as interference light. The object reference light L4 is laser light including a modulation signal and a sample signal.

In the present modification, the light receiving element 10 receives the interference light of the object reference light L4 and the emission light L1, and the demodulation circuit 52 demodulates the sample signal included in the object reference light L4 based on the reference signal Ss and the modulation signal included in the object reference light L4.

The same effects as those of the above-described embodiments can be obtained also in the third modification as described above.

An optical system 50G of the laser interferometer 1 shown in FIG. 19 is the same as the optical system 50F shown in FIG. 18 except that a direction of a light reflecting surface of the polarization beam splitter 4 is different.

The emission light L1 emitted from the laser light source 2 passes through the prism 40 and is split into two beams by the polarization beam splitter 4.

The emission light L1 reflected by the polarization beam splitter 4 is incident on the optical modulator 12 via the quarter-wave plate 8. The emission light L1 is subjected to a frequency shift by the optical modulator 12 and is reflected as the reference light L2. The reference light L2 passes through the quarter-wave plate 8, the polarization beam splitter 4, and the quarter-wave plate 6, and is incident on the object to be measured 14 in a moving state. The reference light L2 is subjected to a Doppler shift at the object to be measured 14, and is reflected as the object reference light L4. The object reference light L4 is incident on the light receiving element 10 through the quarter-wave plate 6, the polarization beam splitter 4, the prism 42, and the analyzer 9.

Meanwhile, the emission light L1 transmitted through the polarization beam splitter 4 is incident on the light receiving element 10 through the prism 42 and the analyzer 9.

Then, the object reference light L4 and the emission light L1 are incident on the light receiving element 10 as interference light. The object reference light L4 is laser light including a modulation signal and a sample signal.

Also in the present modification, the light receiving element 10 receives the interference light of the object reference light L4 and the emission light L1, and the demodulation circuit 52 demodulates the sample signal included in the object reference light L4 based on the reference signal Ss and the modulation signal included in the object reference light L4.

The same effects as those of the above-described embodiments can be obtained also in the fourth modification as described above.

According to the mounting structures shown in FIGS. 16 to 19 as described above, the size of the laser interferometer 1 can be easily reduced. The arrangements of the elements are not limited to the shown arrangements.

In the mounting structures shown in FIGS. 16 to 19, a size of the light receiving element 10 is, for example, 0.1 mm square, a size of the laser light source 2 is, for example, 0.1 mm square, and a size of the optical modulator 12 is, for example, 0.5 to 10 mm square. A size of the substrate 39 on which these components are mounted is, for example, 1 to 10 mm square. This makes it possible to reduce the size of the optical system to about the size of the substrate 39.

Figure 20:
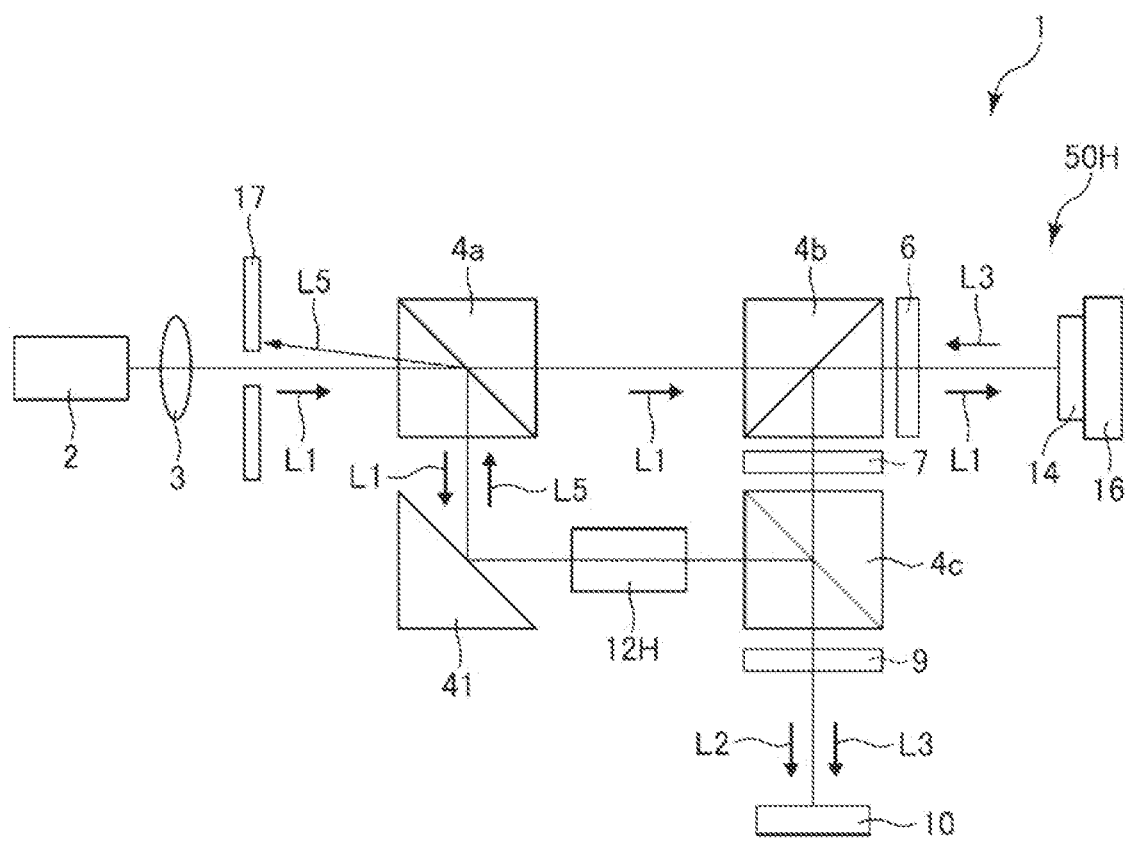
FIG. 20 is a schematic structural diagram showing an optical system included in a laser interferometer according to a fifth modification.

Each of the above-described embodiments and each of the modifications has a so-called Michelson interference optical system. In contrast, an optical system 50H of the laser interferometer 1 shown in FIG. 20 is different in that the optical system 50H is a Mach-Zehnder type interference optical system. The present disclosure is also applicable to a laser interferometer having a Mach-Zehnder type interference optical system.

FIG. 20 is a schematic structural diagram showing the optical system 50H included in the laser interferometer 1 according to the fifth modification. FIG. 20 only shows main optical elements and omits a part of elements.

The optical system 50H shown in FIG. 20 includes the laser light source 2, polarization beam splitters 4a, 4b, and 4c (light splitters), the quarter-wave plate 6, a half-wave plate 7, the analyzer 9, an optical modulator 12H, a mirror 41, the light receiving element 10, and the light shielding element 17. In the optical system 50H, the optical modulator 12H has optical transparency. Therefore, examples of the optical modulator 12H include an acousto-optic modulator (AOM) and an electro-optic modulator (EOM).

Also in the fifth modification example as described above, by providing the light shielding element 17 and tilting the optical modulator 12H as necessary, it is possible to prevent the return light L5 from being incident on the laser light source 2. Therefore, also in the fifth modification, the same effects as those of the above-described embodiments can be obtained.

Although the laser interferometer according to the present disclosure has been described above based on the shown embodiments, the laser interferometer according to the present disclosure is not limited to the above-described embodiments. A configuration of each part can be replaced with any configuration having the same function. Further, any other components may be added to the laser interferometer according to the embodiments. Further, the laser interferometer according to the present disclosure may include any two or more of the above-described embodiments and the above-described modifications.

The laser interferometer according to the present disclosure can be applied to, for example, a vibration meter, a tilt meter, a distance meter (length measuring device), and the like, in addition to the displacement meter or the speedometer described above. Examples of an application of the laser interferometer according to the present disclosure include an optical fiber gyro that implements an optical comb interference measurement technique, an angular speed sensor, an angular acceleration sensor, and the like that enable distance measurement, 3D imaging, spectroscopy, and the like.

What is claimed is:

1. A laser interferometer comprising:
   a laser light source configured to emit laser light;
   a light shield having an opening through which the laser light passes;
   an optical modulator configured to modulate the laser light into reference light having a different frequency; and
   a light receiving sensor configured to receive object light generated by reflecting the laser light by an object to be measured and the reference light and output a light receiving signal, wherein
   $0.10 \text{ [mm]} \leq \varphi_{pin} \leq 10.0 \text{ [mm]}$, wherein $\varphi_{pin}$ is a diameter of the opening,
   the laser light that is incident on the optical modulator is collimated light,
   an optical axis of the collimated light is a first optical axis,
   when return light obtained by the reference light or the object light traveling toward the laser light source is generated, an optical axis of the return light is a second optical axis,
   a position at which the collimated light is generated is a reference position, and
   the first optical axis and the second optical axis are shifted from each other such that $0.10 \text{ [mm]} \leq \Delta y \leq 10.0 \text{ [mm]}$, wherein $\Delta y$ is a shift width between the first optical axis and the second optical axis at the reference position.

2. The laser interferometer according to claim 1, wherein
   a light intensity distribution in a cross section of the collimated light is a Gaussian distribution, and
   $0.50\sigma \leq \varphi_{pin}/2 \leq 3.0\sigma$, wherein $\sigma$ is a standard deviation of the Gaussian distribution, and $\varphi_{pin}$ is the diameter of the opening.

3. The laser interferometer according to claim 2, wherein
   the optical modulator includes a vibrator, and
   the optical modulator modulates the laser light using the vibrator.

4. The laser interferometer according to claim 3, further comprising:
  a demodulation circuit configured to demodulate a sample signal from the light receiving signal based on a reference signal, the sample signal being derived from the object to be measured; and
  an oscillation circuit configured to output the reference signal to the demodulation circuit, wherein
  the vibrator is a signal source of the oscillation circuit.

5. The laser interferometer according to claim 1, wherein the laser light source is a semiconductor laser element.

6. The laser interferometer according to claim 5, further comprising:
  a collimator lens disposed between the laser light source and the light shield, wherein
  the collimator lens collimates the laser light emitted from the laser light source to generate the collimated light.

7. The laser interferometer according to claim 6, wherein the optical modulator includes a vibrator, and
  the optical modulator modulates the laser light using the vibrator.

8. The laser interferometer according to claim 7, further comprising:
  a demodulation circuit configured to demodulate a sample signal from the light receiving signal based on a reference signal, the sample signal being derived from the object to be measured; and
  an oscillation circuit configured to output the reference signal to the demodulation circuit, wherein
  the vibrator is a signal source of the oscillation circuit.

9. The laser interferometer according to claim 5, wherein
  the optical modulator includes a vibrator, and
  the optical modulator modulates the laser light using the vibrator.

10. The laser interferometer according to claim 9, further comprising:
  a demodulation circuit configured to demodulate a sample signal from the light receiving signal based on a reference signal the sample signal being derived from the object to be measured; and
  an oscillation circuit configured to output the reference signal to the demodulation circuit, wherein
  the vibrator is a signal source of the oscillation circuit.

11. The laser interferometer according to claim 1, wherein
  the optical modulator includes a vibrator, and
  the optical modulator modulates the laser light using the vibrator.

12. The laser interferometer according to claim 11, further comprising:
  a demodulation circuit configured to demodulate a sample signal from the light receiving signal based on a reference signal, the sample signal being derived from the object to be measured; and
  an oscillation circuit configured to output the reference signal to the demodulation circuit, wherein
  the vibrator is a signal source of the oscillation circuit.

* * * * *